United States Patent
Payne

(10) Patent No.: US 10,916,391 B1
(45) Date of Patent: Feb. 9, 2021

(54) ARC FLASH DETECTION SYSTEMS AND COMPONENTS THEREOF

(71) Applicant: Glen Payne, Friendswood, TX (US)

(72) Inventor: Glen Payne, Friendswood, TX (US)

( * ) Notice: Subject to any disclaimer, the term of this patent is extended or adjusted under 35 U.S.C. 154(b) by 0 days.

(21) Appl. No.: 17/016,823

(22) Filed: Sep. 10, 2020

Related U.S. Application Data

(60) Provisional application No. 62/904,047, filed on Sep. 23, 2019.

(51) Int. Cl.
| | |
|---|---|
| *H01H 33/26* | (2006.01) |
| *G02B 6/38* | (2006.01) |
| *G02B 6/42* | (2006.01) |
| *G02B 6/44* | (2006.01) |
| *G02B 6/02* | (2006.01) |
| *H01H 33/12* | (2006.01) |

(52) U.S. Cl.
CPC ......... *H01H 33/26* (2013.01); *G02B 6/02033* (2013.01); *G02B 6/3854* (2013.01); *G02B 6/3891* (2013.01); *G02B 6/4292* (2013.01); *G02B 6/4298* (2013.01); *G02B 6/4429* (2013.01); *H01H 33/121* (2013.01)

(58) Field of Classification Search
CPC ............................. H01H 33/26; H01H 33/121
See application file for complete search history.

(56) References Cited

U.S. PATENT DOCUMENTS

| | | | | |
|---|---|---|---|---|
| 5,223,682 A | * | 6/1993 | Pham | .................... H01H 33/26 |
| | | | | 218/63 |
| 6,517,255 B2 | | 2/2003 | Mulligan et al. | |
| 7,373,056 B2 | * | 5/2008 | Bohnert | .................. G02B 6/442 |
| | | | | 250/227.14 |
| 7,738,759 B2 | * | 6/2010 | Parikh | .................. G02B 6/4444 |
| | | | | 385/136 |
| 8,040,517 B1 | * | 10/2011 | Wu | ...................... H02H 1/0023 |
| | | | | 356/432 |
| 8,054,594 B2 | * | 11/2011 | Wu | ...................... H02H 1/0023 |
| | | | | 361/42 |
| 8,070,367 B2 | | 12/2011 | Winberg et al. | |

(Continued)

FOREIGN PATENT DOCUMENTS

EP          3306764 A1      4/2018

OTHER PUBLICATIONS

ABB Inc, REA Arc Protection System Sensor Fiber Installation and Testing, Instruction Book 1VAD266601-MB, May 2009. (Year: 2009).*

(Continued)

*Primary Examiner* — Ryan A Lepisto
(74) *Attorney, Agent, or Firm* — Caesar Rivise, PC

(57) ABSTRACT

A system including ruggedized optic fiber cable assembly for use with an arc detection relay to protect electrical components from faults resulting in an arc flash. The cable assembly includes a pair of ruggedized ST connectors located at opposite ends of a ruggedized optical fiber cable. The cable includes an optical fiber core surrounded by a transparent gel layer and a transparent jacket surrounding the gel layer. Each ST connector includes a boot formed of a resilient material to provide shock absorption for the portion of the optical fiber cable extending through it. An accessory electronic cable is also provided, as are couplers, adapters for mounting the couplers onto walls, and sleeves with air pockets to enhance the ruggedness of the cable at points of stress, e.g., bends.

14 Claims, 8 Drawing Sheets

(56) References Cited

U.S. PATENT DOCUMENTS

| | | | |
|---|---|---|---|
| 8,223,466 B2* | 7/2012 | Roscoe | H02H 1/0023 |
| | | | 361/42 |
| 8,998,506 B2 | 4/2015 | Pepin et al. | |
| 9,016,953 B2 | 4/2015 | Ott et al. | |
| 9,256,035 B2 | 2/2016 | Park et al. | |
| 10,162,125 B2* | 12/2018 | Takahashi | G02B 6/3891 |
| 10,185,102 B2 | 1/2019 | Sawicki et al. | |
| 10,608,830 B2* | 3/2020 | Yang | H04L 12/10 |
| 2008/0226236 A1 | 9/2008 | Pepin et al. | |
| 2017/0138999 A1* | 5/2017 | Kim | G01R 31/1272 |

OTHER PUBLICATIONS 2007 60th Annual Conference for Protective Relay Engineers, Mar. 27-29, 2007, IEEE Catalog No. 07EX1689, ISBN: 1-4244-0995-0, 14 pages.

\* cited by examiner

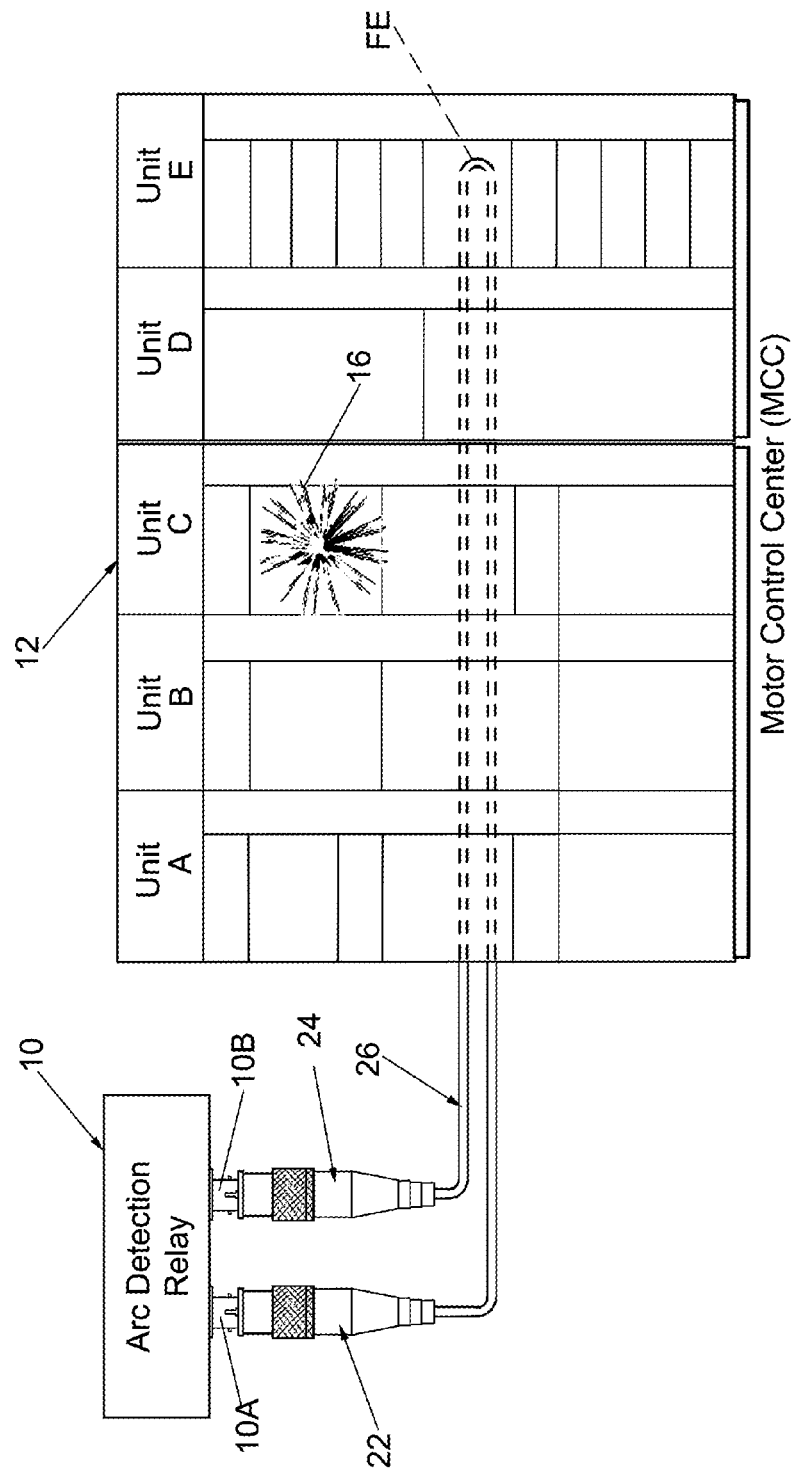

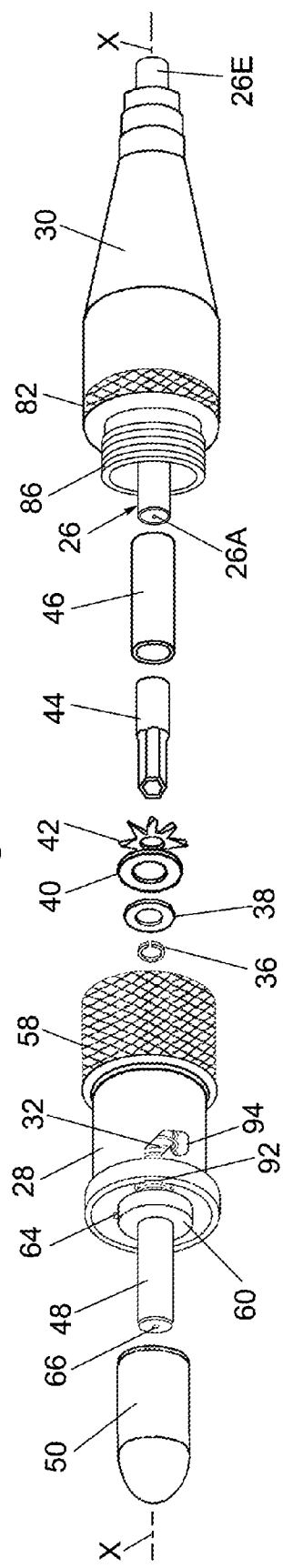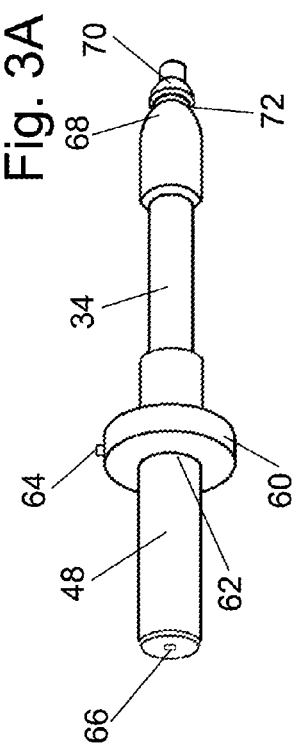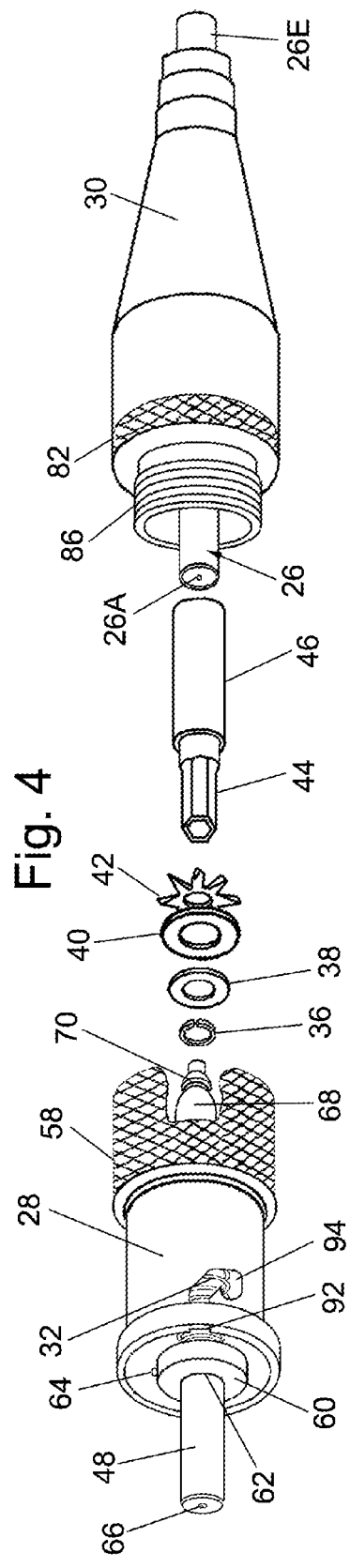

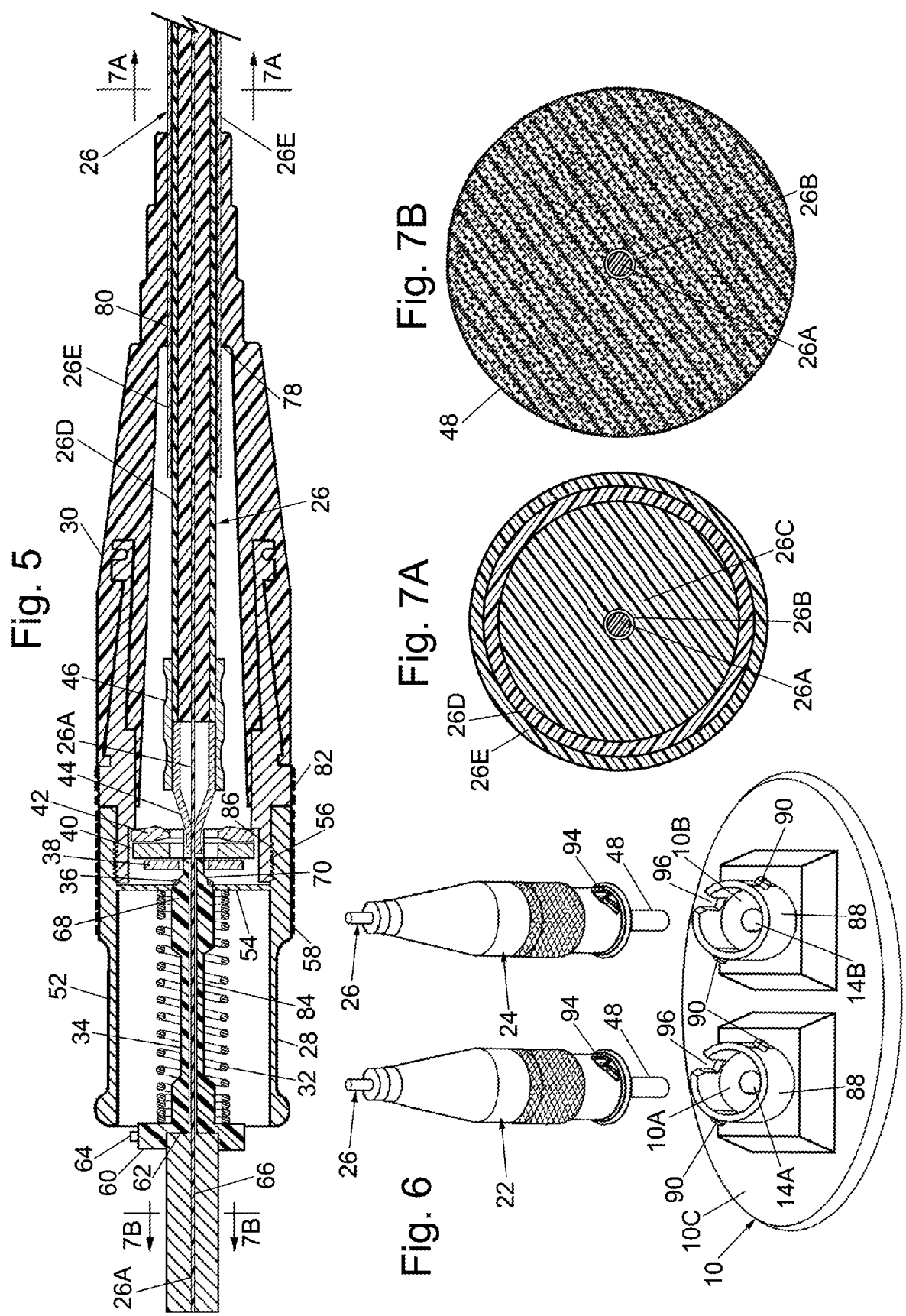

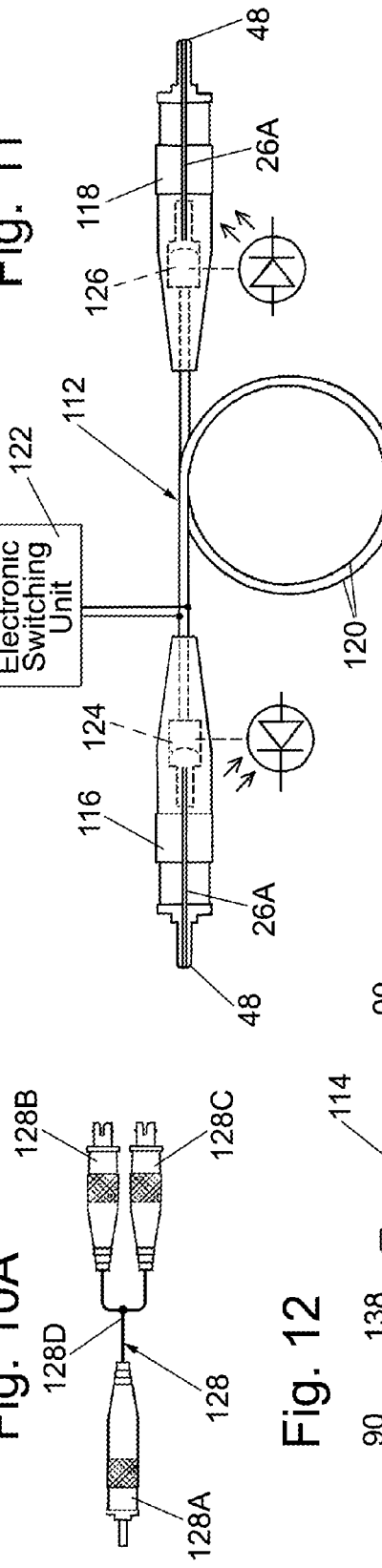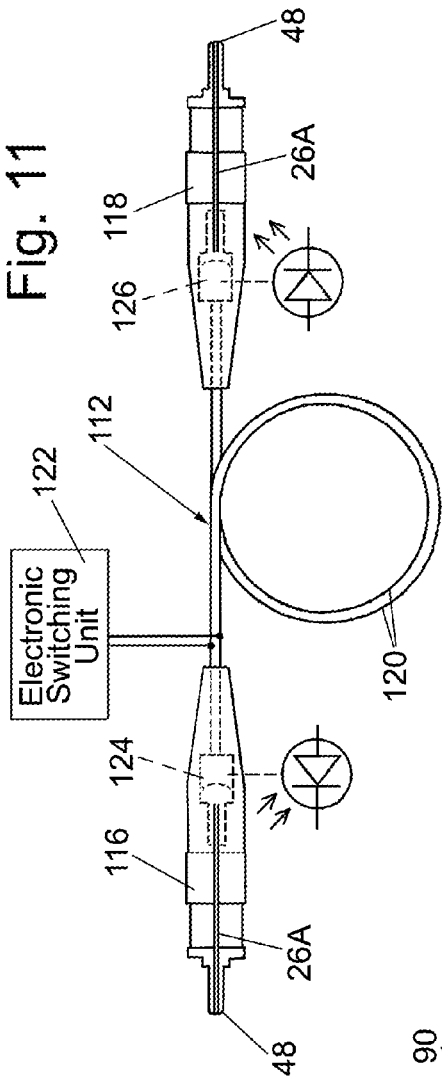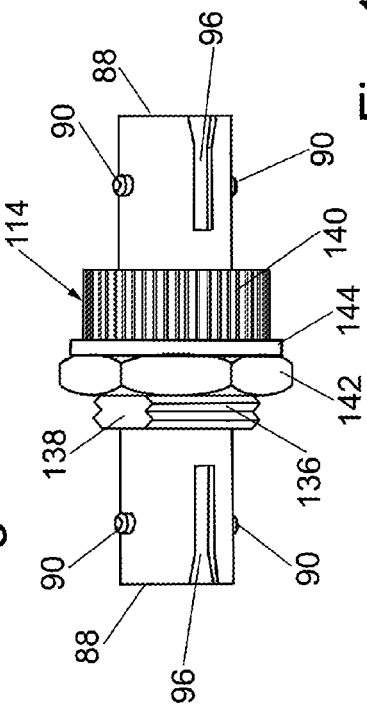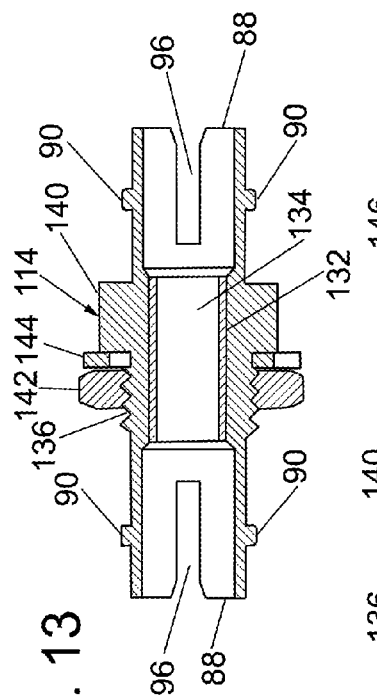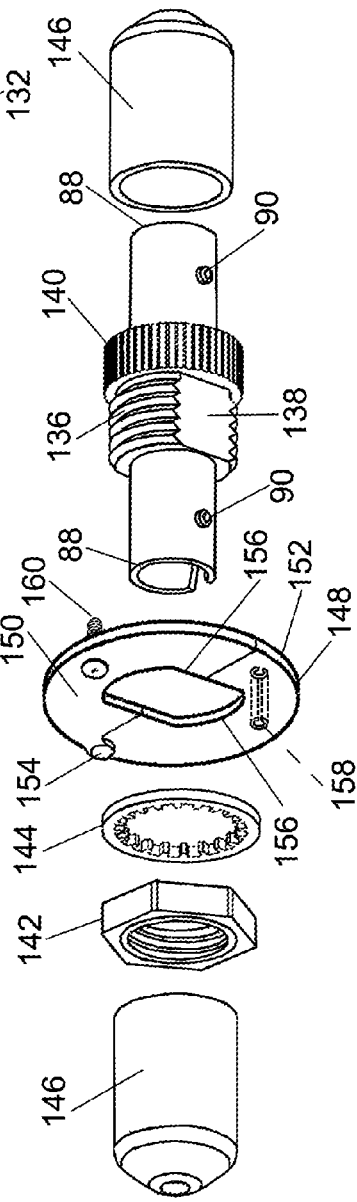

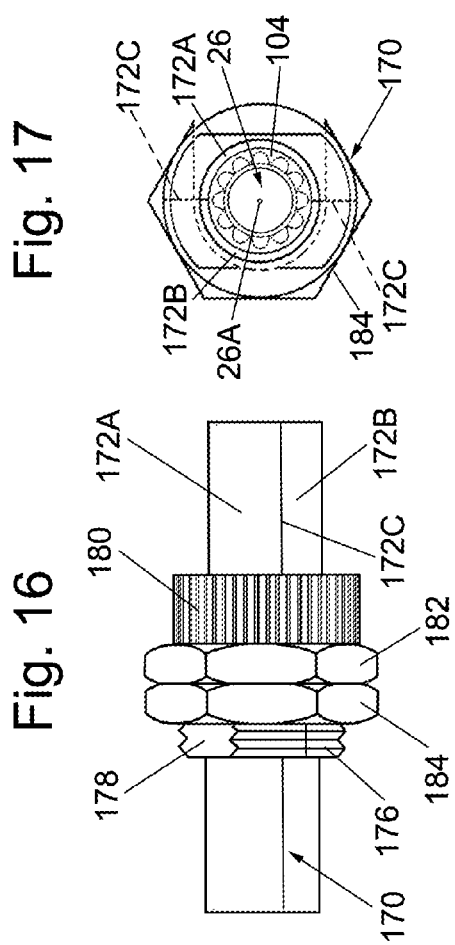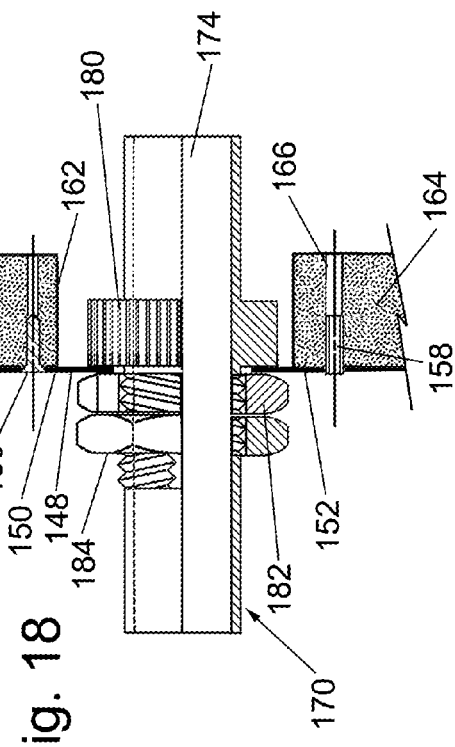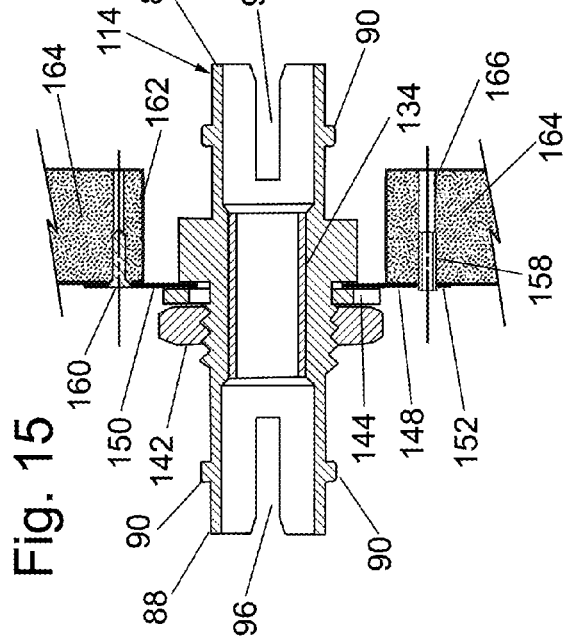

ARC FLASH DETECTION SYSTEMS AND COMPONENTS THEREOF

CROSS-REFERENCE TO RELATED APPLICATIONS

This utility application claims the benefit under 35 U.S.C. § 119(e) of Provisional Application Ser. No. 62/904,047 filed on Sep. 23, 2019, entitled Improved Fiber Optic Network. The entire disclosure of that provisional application is incorporated by reference herein.

FIELD OF THE INVENTION

This invention relates generally to arc flash protection systems for detecting an arc flash from electrical equipment being monitored, and more particularly to optical fiber cable assemblies, electronic accessory cables, and other components that provide a site-based control signal to a power-type integrated circuit electronic arc detection relay to disconnect power upon the detection of an arc flash within the equipment being monitored.

BACKGROUND OF THE INVENTION

Thousands (e.g., approximately 2,000-3,500) of American workers undergo serious injuries from electrical "flashovers" events. The IEEE studied a large utility over the last fifty-three years and found that they had one major arc flash incident every eighteen months. These arc flash incidents occur when unintended electric current flows through air, which superheats it and causes and explosion in open-air, or, in electrical equipment enclosures such as switchgear, motor control centers, power panels, etc. In addition to injuring persons by the heat of the flash, an arc flash can present an explosion hazard if the arc flash occurs in a combustion-prone environment, e.g., during oil/gas production, etc. The majority, i.e., 65%, of arcing incidents occur when an operator is working on electrical equipment with the door open and 10% of the time when they are standing in the front of the equipment.

Arc faults can be caused by various events, and in particular the IEEE/NAFP in 2006 reported they: "can be unintentionally initiated when workers provide a temporary path between two energized phases or phase and ground [or] can occur during switching events, and sometimes without any user intervention when insulation or isolation between electrical conductors is not sufficient to withstand the applied voltage. Environmental contaminants such as metallic dusts, vermin, and forgotten articles or tools can lead to the development of arcing faults. Arcing faults are known to develop in aging equipment, especially when not properly maintained and inspected."

To minimize damage of arc flash, many electro-mechanical systems operating at multiple-cycle speed have been used with some success. However since a utility's power is unlimited at fault offset, power-type integrated circuit relay electronics using a high-speed (IGBT) transistor with self-supervising circuitry, have been developed to trip a single local main circuit breaker. Continuous arc relay sensors or detectors, are or have been available having features like those described in WO19880082170 (Strömberg, OY). That reference discloses a bare fiber sensor of Ritter-Stark-stromtechnik—a German Switchgear manufacturer. The resulting continuous fiber sensor product has largely replaced current-limiting power fuses that fully extinguish the fault in ¼ cycle, i.e., 0.004 seconds. The resulting electronic relay sends a trip to the typical 5 cycle, i.e., $8.3 \times 10^{-3}$ second main breaker to turn off power. It is distributed as originally patented in 1988 through ABB Oy of Finland.

In 2002, the IEEE officially standardized "ANSI-AFD" for arc flash detector systems as the electrical industry term and released a Guide for Arc Flash Hazard Analysis. In 2007, it released a standard that detailed robust testing, and thus new products now have measures to detect, contain and redirect the blast. The Containment function uses much thicker, i.e., 120" sheet metal than used previously on legacy vintage equipment. In 2018, LittelFuse, Inc. developed a single bare fiber, PGA-LS30 for Arc Flash Detectors. Shortly after the provisional filing date, ISO (International Organization for Standardization) replaced the electrical lightning bolt image with a very jagged lightning bolt/explosion image since both occur simultaneously. Fiber sensors are designed so that an arc flash sensed in any compartment is immediately transmitted to the relay input port. Sensor connectors are made by inserting a fiber into a hollow ferrule and securing by a crimp or an epoxy-based adhesive.

The REA 101 Arc Protection Relay uses an extremely thin, e.g., approximately 400 micron diameter bare optical fiber having a first end crimped terminated in a first standard "ST" type connector and a second end and opposite end terminated in a second standard "ST" type connector. The ST type connector is a straight tip type connector developed by AT&T for fiber network implementations. Such connectors have a bayonet-style mechanism that has a twist-on/twist-off motion.

Devices constructed in accordance with WO19880082170 and most other AFD's today, filter out all corona wavelengths to prevent "nuisance tripping" and only full daylight wavelengths are evaluated. The IP-20 rated ABB Arc Protection Relay REA101 indicates that the preferred optical fiber for use therewith is formed of glass and is crimp terminated to multimode graded-index type so that the light rays can travel in several paths down the fiber, refracting in small steps along the path. It also indicated that sensors are stocked in multiple lengths of 5 meters and that each splice reduces available length by 10 meters.

It should be noted that several vendors offer a bare fiber optic connector without a strain-relief boot, as bare fiber is widely used for temporary connections. In actual usage, the first ST connector of the bare optical fiber is connected to one port or receptacle of the Arc Protection Relay REA 101 which is mounted on the equipment front. That port includes a light detecting member, e.g., a photo-sensor. The optical bare fiber is strung internally along a protected path through the cabinet being monitored. Intra-compartmental routing usually is within the power busways. Securing points are loose "skeleton" finger-type mounts which are smaller than most grommets or sub-miniature nylon wire ties. The other end of the optical fiber is looped back to the arc relay so that the second ST connector can be connected to another port of the arc relay. That other port includes a light producing member, e.g., a light emitting diode (LED), to provide periodic pulses of light to enable the arc relay to monitor the integrity of the optical fiber, as will be described shortly.

With the arc relay and the associated optic fiber connected as just described, if an electrical arc occurs in monitored equipment, the flash or burst of light produced by the arc will be picked up by the section of the bare optical fiber closest to the location of the arc, i.e., the light will enter into the optical fiber through the side of the optical fiber, and from there pass down the interior of the optic fiber to the photo-sensor of the arc relay. Upon receiving that light burst, the photo-sensor signal will be transformed to an electrical signal by the arc relay to open a local main coupled to the section of the electrical equipment producing the arc to trip or open, thereby cutting off the electric current to the electrical equipment to terminate the arc. If crucial processes are involved, arc relays connected to a local main and upstream feeder breaker have quicker arc mitigation when both are opened simultaneously in a novel "series" break mode (as described later).

As mentioned above, the REA 101 Relay is designed to periodically produce a pulse of light from the LED and to introduce it into the optical fiber via the first ST connector, whereupon that pulse of light is carried by the optic fiber to the first connector and from the first connector to the input port of the arc relay. Thus, upon receipt of the light pulse at the photo-sensor the electronics of arc relay will recognize that the optical fiber is intact. If, however, the optical fiber is broken, or not properly connected, or otherwise compromised, an LED warning light on the relay illuminates to indicate that safety is jeopardized.

While the bare optical fiber and the ST connectors used with the REA 101 relay, as well other bare optical fibers and connectors of other manufacturers, are generally suitable for their intended purposes, they leave much to be desired from the standpoint of the ruggedness of the optical fiber and its two ST connectors, when exposed to periodic (seismic) or normal (during an offshore rig leg jacking) vibrations. Moreover, prior art arc detection systems making use of optical fiber cables which have to negotiate various bends and curves along the equipment the cable is strung results in attenuation light loss at the bends, thereby limiting the length of optical fiber cable that can be used. Furthermore, the optical fiber cable may be subject to stress-induced damage at points where it is physically mounted on the equipment being monitored by some type of connector, e.g., a clamp. Further yet, those prior art arc detection systems making use of an optical fiber that is looped back to the arc relay to be able to monitor the integrity of the optical fiber have an economic cost. For example, if the straight non-segmented length of optical fiber is two hundred feet long, it can only be extended up to one hundred feet from the arc detection relay since it has to be looped back. If, however, that two hundred foot long optical fiber is configured so that it doesn't loop back, e.g., is in what is known as a "radial" configuration, it could be extended along its entire two hundred foot length to monitor for arc flashes. That radial configuration offers a significant economic saving in optical fiber cost. The downside of such a radial configuration is that the integrity of the optical fiber cannot be monitored.

Thus, a need exists for an arc detection system making use of a ruggedized optical fiber cable having ruggedized ST type connectors that can be used with conventional arc detection relays, such as the ABB Arc Protection Relay REA 101, and which is efficient to minimize light loss along the length of the optical fiber cable, irrespective of bends or curves in the cable, all the while protecting the optical fiber from damage.

The subject invention addresses that need by providing a ruggedized optical fiber cable assembly that can be used in an arc flash protection system including an arc detection relay having ST ports or receptacles and accessory sleeves that include air pockets for disposition about portions of the cable where the cable will be subjected to mechanical stress. In addition, the subject invention also provides an accessory or auxiliary electronics cable that can be used with the ruggedized optical fiber cable assembly to enable the arc detection relay to periodically monitor the integrity of the optical fiber, without requiring any portion of the optical fiber to be connected to the relay port at which the LED is located. By so doing one can effectively utilize the entire length of the optical fiber along the electrical equipment to be monitored. Moreover, the subject invention also provides couplers suitable for extending the optical fiber cable through walls or barriers with no or minimal light loss. One such coupler is a connector type coupler configured for connecting two ST connectors so that two sections of optical fiber cable can be joined by those ST connectors to extend through a wall or other barrier. The other such coupler is a transit type coupler configured for carrying a length of a continuous optical fiber cable through a wall or other barrier. The subject invention also provides adapter assemblies for mounting either the connector ST coupler or the transit coupler through a wall or other barrier irrespective of the thickness of the wall or barrier. Further still, the subject invention also provides a test probe for receiving a burst of light simulating the occurrence of an arc flash to enable one to safely test the operability of the arc flash detection system.

Examples of some prior art optical fiber connectors can be found in the following patent literature: U.S. Pat. No. 6,517,255 (Mulligan et al.); U.S. Pat. No. 8,070,367 (Winberg et al.); U.S. Pat. No. 8,998,506 (Pepin et al.); U.S. Pat. No. 9,016,953 (Ott et al.); U.S. Pat. No. 9,256,035 (Park et al.); U.S. Pat. No. 10,185,102 (Sawiki et al.); U.S. Published Application US2008/0226236 (Pepin et al.); and European Patent EP3306764 (Oskari et al.).

All prior art references cited in this application are specifically incorporated herein in their entireties

SUMMARY OF THE INVENTION

One aspect of this invention is a ruggedized optical fiber cable assembly for use with an arc relay to protect an electrical component from a fault resulting in an arc flash. The arc relay has a first port including a light detector and a second port including a light producing member. The optical fiber cable assembly comprises an optical fiber cable, a first connector, and a second connector. The optical fiber cable comprises a thin optical fiber surrounded by a transparent jacket consisting of an outer sleeve formed of a transparent flexible material and a transparent cured gel interposed between the outer sleeve and the optical fiber. The optical fiber has a first end and a second end and is configured to enable light produced by an arc flash in the vicinity of the optical fiber cable to enter into the optical fiber cable through the transparent jacket to be carried down the thin optical fiber. The first connector is connected to the first end of the optical fiber cable and includes a first ferrule and a first boot. The first ferrule includes a first prong having a first passageway through which the thin optical fiber extends to an end of the first prong. The first boot is formed of a resilient material and has front end, a rear end, and a passageway extending through the first boot between the front end and the rear end of the first boot. The front end of the first boot is connected to the first ferrule. The first passageway at the rear end of the first boot engages the jacket of the optical fiber cable to provide vibration resistance for the thin optical fiber. The second connector is connected to the second end of the optical fiber cable. The second connector includes a second ferrule and a second boot. The second ferrule includes a second prong having a second passageway through which the thin optical fiber extends to an end of the second prong. The second boot is formed of a resilient material and has a front end, a rear end, and a second passageway extending through the second boot between the front end and the rear end of the second boot. The front end of the second boot is connected to the second ferrule. The second passageway at the rear end of the second boot engages the jacket of the optical fiber cable to provide vibration resistance for the thin optical fiber.

In accordance with one preferred aspect of the ruggedized optical fiber cable assembly of this invention, the first ferrule and second ferrules are formed of a metal, e.g., stainless steel, and the first and second prongs are formed of marine grade, high-strength and corrosion-resistant metal.

In accordance with another preferred aspect of the ruggedized optical fiber cable assembly, the jacket is formed of clear UV stabilized polyvinylchloride.

In accordance with another preferred aspect of the ruggedized optical fiber cable assembly of this invention, the gel comprises clear low-viscosity cured UV silicone.

In accordance with another preferred aspect of the ruggedized optical fiber cable assembly, the thin optical fiber has an outer diameter of approximately 0.038 inch.

In accordance with another preferred aspect of the ruggedized optical fiber cable assembly, the gel has a diameter of approximately 0.047 inch.

In accordance with another preferred aspect of the ruggedized optical fiber cable assembly, the jacket has a diameter of approximately 0.127 inch.

In accordance with another preferred aspect of the ruggedized optical fiber cable assembly of this invention, the first connector is configured to be connected to the first port of the arc detection relay. The first connector additionally comprises a first spring coupled to the first ferrule and configured for causing the end of the first prong to engage the first port to produce a good light path between the thin optical fiber and the light detector at the first port when the first connector is connected to the first port. The second connector is configured to be connected to the second port of the arc relay. The second connector additionally comprises a second spring coupled to the second ferrule and configured for causing the end of the second prong to engage the second port to produce a good light path between the thin optical fiber and the light producing member at the second port when the second connector is connected to the second port.

In accordance with another preferred aspect of the ruggedized optical fiber cable assembly of this invention, the first and second ports of the arc relay each include a detent component, wherein the first ferrule includes a slot configured to receive the detent component of the first port to place the first spring under compression to cause the end of the first prong to engage the first port to produce the good light path between the thin optical fiber and the light detector at the first port. The second ferrule includes a slot configured to receive the detent component of the second port to place the second spring under compression to cause the end of the second prong to engage the second port to produce the good light path between the thin optical fiber and the light producing member at the second port.

In accordance with another preferred aspect of the ruggedized optical fiber cable assembly of this invention, the ruggedized optical fiber cable assembly additionally comprises a first opaque sleeve and a second opaque sleeve. The first opaque sleeve is disposed about the optical fiber cable between the optical fiber cable and the first passageway at the rear end of the first boot. The second opaque sleeve is disposed about the optical fiber cable between the optical fiber cable and the second passageway at the rear end of the second boot.

In accordance with another preferred aspect of the ruggedized optical fiber cable assembly of this invention, the optical fiber cable additionally comprises at least one sleeve having a plurality of grooves in an inner surface thereof. The at least one sleeve is located surrounding and secured to the jacket to produce a plurality of shock absorbing air pockets between the sleeve and the jacket to enhance the ruggedness of the optical fiber cable assembly at the location of the at least one sleeve.

In accordance with another preferred aspect of the ruggedized optical fiber cable assembly the at least one sleeve is transparent.

In accordance with another preferred aspect of the ruggedized optical fiber cable assembly of this invention, the at least one sleeve has an outer diameter of approximately 0.25 inch.

In accordance with another preferred aspect of the ruggedized optical fiber cable assembly of this invention the at least one sleeve has a pair of ends and wherein the at least one sleeve is split between the pair of ends to enable the at least one sleeve to be flexed open to place it on the jacket of the optical fiber cable.

Another aspect of this invention is an auxiliary electrical cable for use with an optical fiber cable assembly. The optical fiber cable assembly has a first ST connector at one end thereof and a second ST connector at an opposite end thereof. The first ST connector is configured to be connected to a first port of an arc detection relay at which a light detector is located. The arc detection relay also has a second port and which a light producing member is located to produce periodic bursts of light thereat. The optical fiber cable assembly is configured to be extended adjacent electrical equipment to be protected from a fault resulting in an arc flash, whereupon light from the arc flash passes into an optical fiber cable forming a portion of the optical fiber cable assembly from a side thereof to cause the arc detection relay to produce a signal for interrupting electrical power to the electrical equipment. The auxiliary electrical cable comprises a third connector, a fourth connector, and electrical conductors. The third connector is configured to be connected to the second ST connector of the optical fiber cable assembly. The third connector includes a light producing member configured when electrically energized to produce a burst of light and to introduce the burst of light into the second ST connector of the optical fiber cable assembly. The fourth connector is configured to be coupled to the second port of the arc detection relay. The fourth connector includes a light detector configured to produce electrical signals in response to the periodic bursts of light from the light producing member at the second port of the arc detection relay. The electrical conductors are connected between the third and fourth connectors of the auxiliary electrical cable for carrying the electrical signals to energize the light producing member of the third connector.

In accordance with one preferred aspect of the auxiliary electrical cable of this invention, the auxiliary electrical cable additionally comprises electronic circuitry for providing electrical power to the light producing member of the first connector.

In accordance with another preferred aspect of the auxiliary electrical cable of this invention, the light producing member comprises a light emitting diode and the light detector comprises a photocell or a photo-resistor.

Another aspect of this invention is an arc detection system comprising an arc detection relay, an optical cable assembly and an auxiliary cable. The arc detection relay is configured to provide a output signal to cut off electrical power to electrical equipment coupled to the arc detection relay in automatic response to the detection of an arc flash at the electrical equipment. The arc detection relay has a first port at which a light detector is located, and a second port and which a light producing member is located to periodically produce a burst of light thereat. The optical cable assembly comprises a first ST connector configured for connection to the first port, an optical fiber cable having a first end connected to the first ST connector, and a second end connected to a second ST connector. The optical fiber cable assembly is configured to be extended adjacent the electrical equipment, whereupon light from an arc flash at the electrical equipment passes into the optical fiber cable from a side thereof. The auxiliary electrical cable comprises a third connector, a fourth connector and electrical conductors. The third connector is configured to be coupled to the second ST connector and includes a light producing member configured when electrically energized to produce a burst of light and to introduce the burst of light into the second ST connector. The fourth connector is configured to be coupled to the second port of the arc detection relay. The fourth connector includes a light detector configured to produce electrical signals in response to the periodic bursts of light from the light producing member at the second port. The electrical conductors are connected between the third and fourth connectors for carrying the electrical signals to energize the light producing member of the third connector.

In accordance with one preferred aspect of the arc detection system, the arc detection system additionally comprises an optic fiber splitter having a portion interposed between the second ST connector and the third connector. The optic fiber splitter includes an optical fiber probe connector configured to receive a test burst of light from an external test light source simulating an arc flash, whereupon the test burst of light is carried from the optic fiber splitter to the second ST connector and from there to the second port.

Another aspect of this invention is a coupler assembly configured for receipt of an optical fiber cable to enable the optical fiber cable to pass through a wall having an opening therein. The coupler assembly comprises a coupler and an adapter assembly. The coupler comprises a tubular body and an internally threaded fastener. The tubular body has a pair of ends connected by an internal passageway extending between the pair of ends. The tubular body includes an externally threaded portion and an annular wall portion located adjacent the externally threaded portion and projecting outward with respect to the externally threaded portion. The externally threaded portion includes two opposed flattened areas. The internally threaded fastener is configured to be threadedly secured onto the externally threaded portion of the tubular body to produce a space between the internally threaded fastener and the annular wall portion. The adapter assembly comprises a pair of thin planar members, one of which is configured to be secured to the wall adjacent the opening therein. The pair of thin planar members have respective recesses and are pivotably connected to each other, whereupon the recesses conjoin to form an opening receiving the externally portion and the two opposed flattened areas of the coupler, with portions of the pair of thin planar members located adjacent the annular wall, whereupon the internally threaded fastener can be screwed onto the externally threaded portion to tightly sandwich the portions of said the of thin planar members in the space between the internally threaded fastener and the annular wall.

In accordance with one preferred aspect of the coupler assembly the internal passageway is configured to receive respective prongs of respective ST connectors. Each of the prongs is configured for holding an end portion of an optical fiber therein so that the optical fibers are axially aligned and abut each other in a good light transmissive interface.

In accordance with another preferred aspect of the coupler assembly the other one of the pair of thin planar members includes a pin configured to be located in a hole in the wall located adjacent the opening.

In accordance with another preferred aspect of the coupler assembly the coupler includes two half sections configured to be connected together to form the tubular body.

In accordance with another preferred aspect of the coupler assembly the internally threaded fastener comprises a slip-on twist close nut.

Another aspect of this invention is a coupler configured for receipt of an optical fiber cable to enable the optical fiber cable to pass through a wall having an opening therein. The coupler comprises two half sections and at least one internally threaded fastener. The two half sections are configured to be connected together to form a tubular body. The tubular body has a pair of ends connected by an internal passageway extending between the pair of end and configured to receive an optic fiber cable therein. The tubular body includes an externally threaded portion and an annular wall portion located adjacent the externally threaded portion and projecting outward with respect to the externally threaded portion. The externally threaded portion includes two opposed flattened areas. The at least one internally threaded fastener is in the form of a slip-on twist close nut configured to be threadedly secured onto the externally threaded portion of the tubular body to secure the two half sections together.

DESCRIPTION OF THE DRAWING

FIG. 2 is an illustration of one exemplary arc protection system of the subject invention making use of the use of the optical fiber cable assembly of FIG. 1 coupled to a conventional arc detection relay in a loop configuration to protect vertical sections of electrical equipment components, e.g., a Motor Control System (MCC), from a fault resulting in an arc flash in the MCC;

FIG. 3 is an exploded isometric view of one ruggedized ST connector of the optical fiber cable assembly shown in FIG. 1 and shown with a removable cap for protecting the prong of the ST connector;

FIG. 3A is an exploded isometric view of a few of the components of the ruggedized ST connector shown in FIG. 3;

FIG. 4 is another exploded isometric view of the ruggedized ST connector shown in FIG. 3, but without the removable cap;

FIG. 5 is an enlarged longitudinal sectional view of the fully assembled ruggedized ST connector shown in FIGS. 3-4 with the removable protective cap removed;

FIG. 6 is an enlarged isometric view of the two ruggedized ST connectors of the optical fiber cable assembly of FIG. 1 shown being oriented for connection to respective ports of the arc detection relay shown in FIG. 2;

FIG. 7A is an enlarged sectional view, not exactly to scale, taken along line 7A-7A of FIG. 5;

FIG. 7B is an enlarged sectional view, not exactly to scale, taken along line 7B-7B of FIG. 5;

FIG. 10A is an illustration of the optical fiber splitter shown in FIG. 10;

FIG. 11 is an enlarged schematic illustration of the auxiliary electrical cable shown in FIG. 10;

FIG. 12 is an isometric view of a connection ST coupler used to connect any two ST connectors of the subject invention to each other;

FIG. 13 is a longitudinal sectional view of the connector ST coupler shown in FIG. 12;

FIG. 14 is an exploded isometric view of the connection ST coupler of FIGS. 12 and 13 shown with a pair of removable protective end caps, and with an adapter assembly configured for mounting the connection ST coupler to a wall or other barrier through which the cable assembly of the subject invention will be strung irrespective of the thickness of that wall or partition;

FIG. 15 is a longitudinal sectional view showing the use of the adapter assembly shown in FIG. 14 to mount the ST coupler on a thick wall barrier, e.g., through a panel of sheetrock;

FIG. 16 is a side elevation view of a transit coupler forming a portion of a system of this invention through which a continuous section of the ruggedized cable assembly of the subject invention can be strung to pass through a wall or other barrier;

FIG. 17 is an end view of the transit coupler of FIG. 16 showing it with the optical fiber cable of the subject invention extending through it; and FIG. 18 is an longitudinal half sectional view showing the use of the adapter assembly of FIG. 15 mounting the transit coupler of FIGS. 16 and 17 through a thick wall or barrier, e.g., through a panel of sheet rock.

DETAILED DESCRIPTION OF PREFERRED EMBODIMENTS

Figure 1:
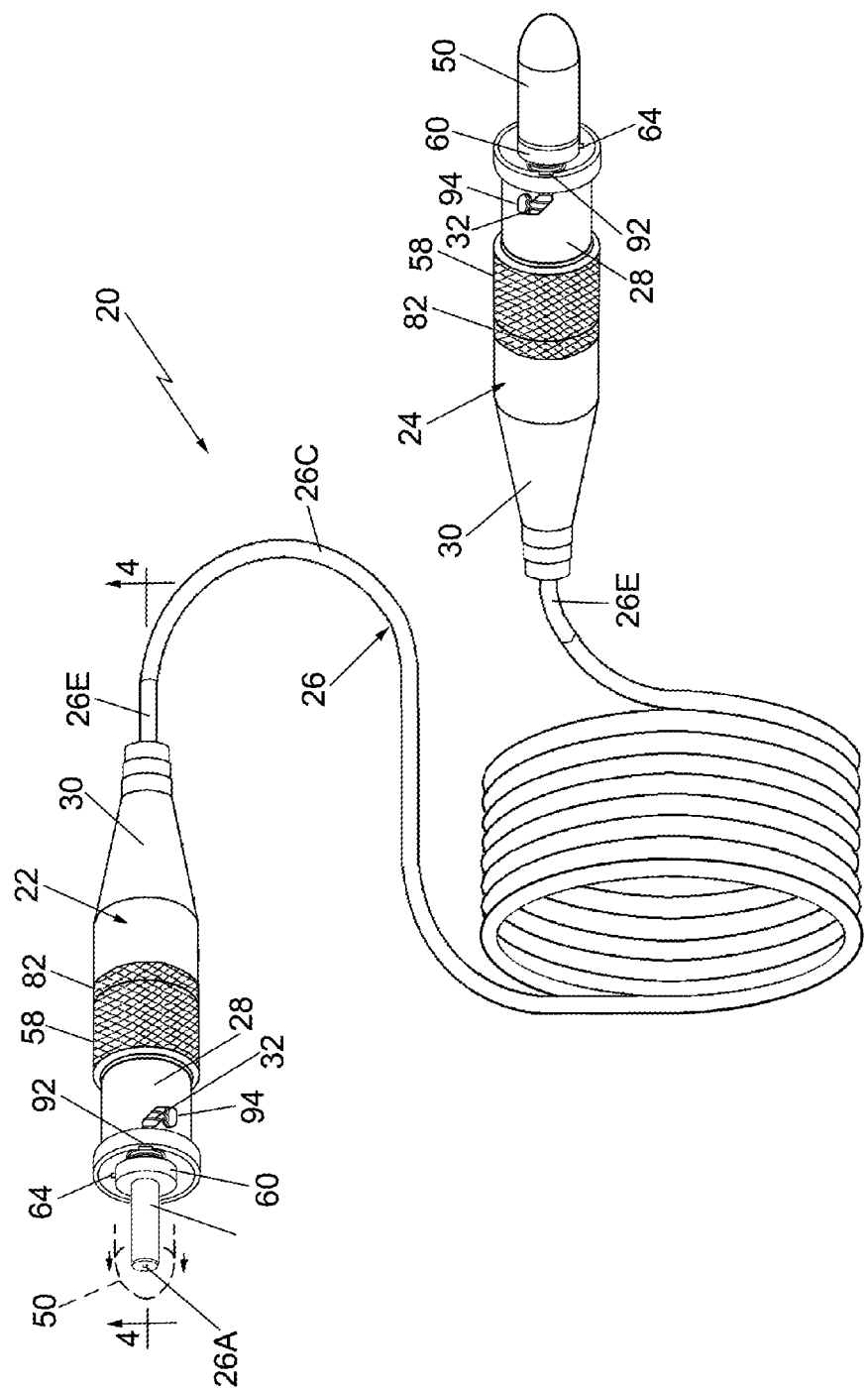
FIG. 1 is an isometric view of one exemplary embodiment of a ruggedized optical fiber cable assembly including a ruggedized optical fiber cable and a pair of ruggedized ST connectors constructed in accordance with this invention.

Referring now to the various figures of the drawing wherein like reference characters refer to like parts, there is shown in FIG. 1 one exemplary embodiment of a ruggedized optical fiber cable assembly 20 constructed in accordance with this invention. The optical fiber cable assembly 20 is configured to be used with a conventional arc detection relay 10, like the ABB Arc Protection Relay REA 101 unit described above, to protect any type of electrical equipment which could produce an arc flash.

It must be pointed out at this juncture that the subject invention can be used with any type of conventional arc protection relay to protect any air, vacuum, oil or sulfur hexafluoride (SF6)-insulated electrical equipment that could potentially produce an arc flash. In the exemplary embodiment shown in FIG. 2, the exemplary arc detection relay 10 includes a first port or receptacle 10A that includes a conventional ST coupling used for releasable connection to an ST type connector. The port 10A has a photo-sensor, e.g., a photo-resistor 14A (FIG. 6), located within the housing 10C of the relay and in communication with the interior of the ST coupling at port 10A. The second port or receptacle 10B is also configured as a conventional ST coupling for releasable connection to an ST type connector and has a light producing member or element, e.g., a light emitting diode (LED) 14B (FIG. 6), located within the housing of the relay and in communication with the interior of the ST coupling at port 10B. The photo-resistor and LED form a portion of the electronics unit of the arc detection relay 10 and operate as described above.

The exemplary electrical equipment being protected in FIG. 2 constitutes a Motor Control Center (MCC) 12 receiving incoming power from a local main circuit breaker (not shown) distributed horizontally to vertical sections or units A, B, C, D, and E of MCC 12 and within each section or unit to outgoing combination starters or small feeder circuit breaker compartments. The exemplary MCC unit 12 shown in FIG. 2 is composed of two "shipping" units, one of which is made up of Units A, B and C, while the other of which is made up of Units D and E. The two shipping units are disposed immediately adjacent each other so that the end wall of Unit D is immediately adjacent the end wall of Unit C. All of the MCC units are illustrated with some removable compartments empty for clarity of fiber routing. It should be noted that the exemplary MCC unit illustrated in FIG. 2 has more potential arc flash component types per square foot of floor space than switchgear. Accordingly, prior art switchgear systems required four corner thin fiber legs vs. two ruggedized mid-wall optical cables per vertical section for the customer connections located at the customer's outgoing connection rear of the switchgear.

As should be appreciated by those skilled in the art, the particular manner of routing and connecting the optical fiber cable assembly of this invention will require adequate planning and suitable installation techniques dependent upon the nature and quantity of electrical equipment points being monitored. In the exemplary illustration of FIG. 2, the optical fiber cable assembly of FIG. 1 is shown coupled to the arc detection relay 10 to protect vertical sections of the MCC 12 from a fault resulting in an arc flash in the top draw-out compartment, which arc flash could potentially result from power disconnects, safety mechanical interlocks, faulty insulation or loose power connectors.

The fiber optic cable assembly 20 basically comprises a first ruggedized ST connector 22, a second ruggedized ST connector 24 and a ruggedized optical fiber cable 26 interconnecting the connectors 22 and 24. To that end, one end of the cable 26 is terminated within the ST connector 22 and the other end of the cable is terminated within the ST connector 24.

It should be noted that the term optical fiber is also commonly referred to as a "fiber optic" and thus either term may be used herein. So too, the term "transparent" is also commonly referred to as "clear" when referring to an optical fiber. Moreover, it should also be noted that the description the subject invention to follow may include directional terminology, such as "top," "bottom," "front," "back," "leading," "forward," "trailing," "distal," "proximal," etc. Such language, if used, is used with reference to the orientation of the figure(s) and the components thereof being described. Because components of embodiments of the present invention can be positioned in a number of different orientations, the directional terminology is used for purposes of illustration and is in no way limiting, and is to be understood that other embodiments may be utilized and structural or logical changes may be made without departing from the scope of the present invention.

The details of the construction and operation of the optical fiber cable 26 will be described later with respect to FIGS. 5 and 7A. Suffice it for now to state that the optical fiber cable basically comprises a very small diameter optical fiber core 26A having a very thin transparent refractory applied layer or cladding 26B on its outer surface. The refractory surface is surrounded by a gel, which is encased in a PVC jacket. Each of these materials have a different refractive index at the boundary layers. This unified composite forms what will be referred to hereinafter as the "optical fiber", the gel and jacket both serve a cladding function as each layer enables redirection of "extreme meridinal rays", as described earlier, back into the core due to differing refractive indices. In any case, the optical fiber making up the cable 26 is surrounded by a layer of transparent shock-absorbing gel 26C having a refractive index of 1.49, which in turn is surrounded by a transparent jacket 26D having a refractive index of 1.53. The transparent jacket's function is to hold the gel in place. The gel and jacket form a protective, shock-absorbing envelope for the delicate optical fiber.

The rear end portion of each ST connector 22 and 24 is in the form of an elastomeric, e.g., rubber, boot (to be described later), having a passageway (also to be described later) through which an end of the cable passes. At the location where the cable 26 enters the boot and at other places along the cable (which will be described later) an opaque plastic jacket sleeve 26E is provided. The jacket sleeve is preferably used wherever there will be a bend in the cable 26 to serve as a light barrier to prevent ambient light from entering the cable and into the optical fiber through the bent portion, since such ambient light could interfere with the operation of the system to detect and interrupt and arc fault. Since the point at which the cable 26 enters the ST connector typically becomes curved or bent when then cable is strung through the equipment being protected, the opaque jacket sleeve 26E is preferably used at the point where the cable enters into the ST connector, i.e., through a passageway in the boot.

In order to facilitate the placement of a section of jacket sleeve on the jacket 26D of the cable at the desired location(s) therealong the jacket sleeve 26E is split longitudinally. Thus, as can be seen in FIG. 5 a section of an opaque jacket sleeve 26E is mounted around the section of the cable's jacket 26D where the cable extends through the passageway in boot.

In accordance with one exemplary preferred embodiment of the optical fiber cable 26 of this invention, the optical fiber core 26A has a 0.40 as a minimum numerical aperture. The jacket 26D is formed of a clear or transparent approximately 0.125 inch diameter material, such as UV stabilized Mil-I-631D Grade C polyvinylchloride (PVC), QPL Approved, ASTM D 922 or UL Subject 224VW-1. One particularly suitable jacket 26D is available from Insultab, Inc. as part number 4900. The gel layer 26C is formed of ASTMC639 clear low-viscosity cured UV silicone that is 0.085 inch in diameter. The cross-linked gel can withstand long-term environment temperature of 180° F. undamaged at a 50% safety factor. Other gel materials can be used, including various silicone formulations that meet or exceed these values. The opaque jacket sleeve 26E is formed of PVC and is 0.156 inch in diameter It must be point out that the materials making up the cable 26 and their dimensions are merely exemplary such that other materials can be used to make up the cable, with the dimensions of those other materials being different than the examples given above.

In any case the use of the jacket 26D with the intermediate gel layer 26C disposed over the cladded core results in an optical fiber cable 26 that is much more rugged than a bare optical fiber, particularly bare optical fibers like those of the prior art which are approximately 400-500 microns in diameter. Hence, the optical fiber cable of this invention is much less prone to damage or breakage under use than a bare optical fiber and in that regard can be considered to be "ruggedized".

The cable 26 is configured to be located adjacent, e.g., within a range of up to approximately two feet, any electrical equipment which could produce an arc flash so that light resulting from an arc flash in that equipment passes through the outer jacket 26D and the intermediate gel layer 26C of the cable into its optical fiber. From whence the light is transmitted internally down the length of the optical fiber without any significant attenuation loss so that it can be detected by the photo-resistor 14A of the arc detection relay 10. The arc detection relay 10 then provides an output signal that is used by any electrical equipment (e.g., power transformers, bus ducts, switchgear, etc.) located upstream of the electrical equipment being monitored to interrupt the electrical power to the electrical equipment being monitored.

As mentioned earlier in the embodiment shown in FIGS. 2 and 6 the electrical equipment being monitored is MCC 12. For that application the first connector 22 is configured to be connected to the port or receptacle 10A of the arc detection relay 10, while the second connector 24 is connected to the port or receptacle 10B and with the optical fiber cable 26 extending from the port 10A through the cabinetry of the MCC units A-E to the end thereof and then back to the port 10B in what can be called a "loop" configuration. Thus, any light that is produced as a result of an arc flash will enter the cable 26 and pass down its optical fiber to the first connector 22 and from there to the photo-resistor 14A at the first port 10A, which will result in the arc detection relay providing an output signal causing the circuit breaker associated with the MCC unit producing the arc flash to trip, thereby disconnecting electrical power from the MCC unit. In particular, in the exemplary embodiment shown in FIG. 2, the arc flash is shown schematically by the graphic image 16 located within Unit C. Accordingly, upon the occurrence of an arc flash 16 within unit C, the light burst produced by that flash will be picked up by the portion of the optical fiber cable 26 located within that unit, and that light burst will be carried by the optical fiber of the cable to the photo-resistor 14A at that port, whereupon the arc detection relay will produce an output signal to cause the circuit breaker for Unit D to trip.

The arc detection relay 10 is also configured to monitor the integrity of the optical fiber of the cable 26. That action is achieved by the LED 14A at the port 10B periodically, e.g., every five seconds, producing a pulse of light and introducing it into the second ST connector 24, whereupon those pulses of light are carried to the first connector and from it to the photo-resistor 14A of the arc detection relay if the optical fiber core is intact. Thus, as stated earlier, upon receipt of the light pulses the electronics of arc detection relay will recognize that the optical fiber is intact.

As best seen in FIGS. 3-5 the ST connectors 22 and 24 are of identical construction and each constitutes a modification of what is known as an "ST" type connector to ruggedize it and to provide additional protection to the cable within the ST connector. To that end, the ruggedized ST connectors 22 and 24 each comprise a ferrule 28, a boot 30, a heavy-duty helical compression spring 32, a central hub 34, a ring-like retainer clip 36, a small washer 38, a large washer 40, a star washer 42, a tubular fiber crimp 44 having a hexagonal end, a tubular jacket crimp 46, a prong 48, and a removable dust cap 50 (FIGS. 1 and 3). The ferrule 28 includes a tubular collar portion 52 having an internal wall 54. The proximal end of the collar includes an internal helical threaded bore 56 located adjacent the proximal side of the wall 54. The outer surface of the collar at the proximal end thereof is knurled at 58. The central hub includes a circular flanged distal end portion in the form of a socket 60 having a recess 62 at the distal end thereof and centered on the longitudinal central axis X of the ST connector. The recess in the socket is configured to receive one end of the prong 48. The prong 48 is a rod-like member formed of a marine grade, high-strength and corrosion-resistant metal. The ferrule 28 is preferably formed of stainless steel. The prong is held in place within the recess 62 of the socket by a set screw 64. The prong includes a central passageway 66 extending coaxially with the longitudinal central axis X and whose inside diameter is equal to the outside diameter of the optical fiber so that the distal end of the optical fiber can be received and held snuggly therein.

The front end of the optical fiber is planar and polished and terminates at the free end of the prong 48. The free end of the prong is also planar and is flush with the polished planar front end of the optical fiber.

In accordance with one exemplary embodiment of this invention, the prong 48 of each ST connector is approximately 0.2 inch in length, with the length of the entire ST connector without the protective cap 50 being 2.2 inches.

The helical spring 32 is disposed about the central hub 34 and tightly interposed between the internal wall 54 and the socket 60 so that the spring is under compression. The spring is a heavy-duty component, e.g., capable of applying a bias of 230 Newtons of compressive loading to the associated components of the ST connector and the port to which it will be secured.

The proximal end 68 of the central hub is rounded and tapers downward (FIG. 3A), with a portion 70 of the end 68 extending through a central opening in the internal wall 54 so that the portion 70 is located on the opposite side of the internal wall as the spring 32. The tapered rounded surface of the proximal end 68 of the central hub cooperates with a centrally located opening in the internal wall 54 to form a pivot point thereat to enable the central hub 34 to pivot at a slight acute angle to the longitudinal axis X. That action facilitates the connection of the ST connector to its associated port of the arc detection relay (as will be described later). An annular recess 72 (FIG. 3A) is located in the portion 70. The ring-like retainer clip 36, which is larger in external diameter than the central hole in the internal wall 54, is disposed in the annular recess 72 to retain the distal portion of the central hub in place, thereby holding the compression spring under compression, while still enabling the central hub to pivot with respect to the longitudinal central axis X.

The boot 30 of each ST connector 22 and 24 is a tubular member having a front end section 74 and a rear end section 76. The front end section 74 is an externally threaded tubular member preferably formed of stainless steel. In particular the front end section includes an external thread 86 which is configured to be threadedly secured within the internally threaded bore 56 in the proximal (rear) end of the ferrule 28. The rear end section 76 is a tubular member that is fixedly secured to the front end section and is preferably formed of a resilient material, e.g., rubber.

The washers 38, 40 and 42 are conventional members commonly found in ST connectors for optical fibers and are located within the hollow interior of the boot with the washer 38 surrounding the portion 70 of the central hub and with the washers 40 and 42 surrounding the distal end of the fiber crimp 44. The washers perform the functions of making the ST connector less sensitive to mechanical shock and vibration.

The rear end of the resilient material section 76 of the boot 30 is in the form of a thickened end wall 78 having a central passageway 80 centered on the longitudinal axis X. The inner diameter of the passageway 80 is approximately the same as the outer diameter of the jacket sleeve 26E of the optical fiber cable, so that the portion of the wall 78 of the boot contiguous with the passageway 80 tightly engages the jacket sleeve 26E. That fact coupled with the fact that the rear section 76 of the boot at the passageway 80 is formed of a resilient material, e.g., rubber, stabilizes and provides shock resistance to the portion of the optical fiber cable extending through the passageway 80. The distal end portion of the rear end section 76 includes a knurled outer surface 82. That knurled outer surface cooperates with the knurled outer surface 58 of the ferrule to provide a user with gripping surfaces to facilitate the assembly of either of the ST connectors 22 or 24.

The assembly of the ST connectors 22 and 24 will now be described with reference to FIGS. 4 and 5. Since those connectors are identical in construction the manner of assembly of only one, i.e., ST connector 22, will be described in the interest of brevity. To that end, an end of the cable 26 with a section of the opaque jacket sleeve 26E thereon is introduced into and through the passageway 80 in the boot 30 of the ST connector 22 until the distal end of the jacket sleeve is within the boot slightly in front of the end wall 78, leaving a portion of the jacket 26D of the cable in front (distally) of the jacket sleeve exposed. A portion of the exposed distal end of the jacket 26D is removed, e.g., cut away by a cutter, to expose a portion of the gel 26C thereby leaving a section, e.g., a few inches of the end portion of the optical fiber exposed. That now-exposed portion of the distal end of the optical fiber is threaded into the distal end of the tubular jacket crimp 46, and the fiber crimp 44. The free end portion of the optical fiber is then be extended through the washers 42, 40 and 38 into a central longitudinally extending bore or passageway 84 in the central hub 34. That bore or passageway 84 is slightly larger than the outside diameter of the optical fiber to facilitate the insertion of the unstripped optical fiber therein. From there the optical fiber is extended into and through the passageway 66 in the prong 48 until the free end of the optical fiber extends out of the planar free end of the prong, e.g., the free end of the optical fiber is located 0.5 inch from the free end of the probe. The cable 26 is then retracted to pull the optical fiber slightly toward the ferrule while slowing rotating the cable about its axis X. The jacket crimp 46 is crimped to cause it to tightly engage the jacket 26D of the cable. The distal end of the fiber crimp 44 is also crimped to bring it into tight engagement with the optical fiber and in particular with the cladding 26B on the core 26A, thereby fixing the optical fiber to the fiber crimp 44. The crimping of prong 48 crimps 44 and 46 and can be achieved using a crimp tool with stop limits available from FiberFin, Inc. as part number: FF-HTC-SWG-GTO. The threaded bore 56 of the ferrule 28 is then screwed onto the externally threaded end 86 of the boot 30 by grasping the knurled portions 56 and 82 and twisting them relative to each other to screw the ferrule to the boot. Once that has been accomplished the portion of the optical fiber extending beyond the planar free end of the prong 48 can be cut off and polished so that the polished end is planar and flush with the planar free end of the prong 48. Instead of using the tool just described to terminate the fiber with cladding still attached, the optical fiber can be stripped, and adhesively secured within the passageway 66, by rotating the fiber coated with an epoxy-based adhesive which reduces surface tension while centering the fiber. Treatment of the prong's tip with a MilSpec (M24794-1) Index Matching Gel aids in transmission and also reduces tendency for mold to develop over time.

The prong 48 of the ST connector 22 is configured for receipt within the port or receptacle 10A of the arc detection relay 10 so that the polished end of the optical fiber at the free end of the prong forms a good light transmissive interface between it and the photo-resistor 14A of the port 10A. In a similar manner the prong 48 of the ST connector 24 is configured to be received within the port or receptacle 10B of the arc detection relay so that the polished end of the optical fiber at the free end of the prong forms a good light transmissive interface between it and the LED 14B of the port 10B. To achieve that end, attention is now directed to FIG. 6 which shows the ST connectors 22 and 24 of the cable 26 juxtaposed opposite respective ST couplings of the ports 10A and 10B, respectively, to releasably secure the ST connectors 22 and 24 to the arc detection relay 10. Thus, when the ST connector 22 is connected to the ST coupling at port 10A any flash of light carried by the optical fiber core will be received by the photo-resistor without significant attenuation at the interface of the optical fiber and photo-resistor 14A. So too, when the ST connector 24 is connected to the ST coupling at port 10B, the periodic flashes of light produced by the LED 14B to test the integrity of the optical fiber cable will enter into the optical fiber without significant attenuation at the interface of the LED and the optical fiber.

The details of the ST ports 10A and 10B will now be described, it being understood that the ST couplings at both ports are of identical construction to each other and are constructed in accordance with the prior art. In the interest of brevity only the construction of the ST coupling at the port 10A will be described. That port basically comprises a tubular socket 88 projecting outward from a wall of the housing of the arc relay. The photo-sensor 14A is located within the housing centered in the base of the socket 88 at the port 10A. The LED 14B is located within the relay's housing centered in the base of the socket 88 at the port 10B. A pair of small nubs or pins 90 project outward from the outer surface of the socket diametrically opposed to each other. The pins 90 serve as detent components to cooperate with longitudinally extending channels and associated slots in the collar 52 of the ferrule 28 to establish the twist on/off bayonet connection of the ST connectors to the ports 10A and 10B. In particular, as best seen in FIG. 4, the collar 52 of each ST connector 22 and 24 includes two longitudinally extending channels 92 located diametrically opposed to each other on the inner surface of the collar. Each channel starts at the front edge of the collar (which edge is slightly thickened and rounded) and terminates in a respective one of a pair of slots 94 in the collar immediately adjacent the channels. Each slot 94 includes an angularly extending section having a first end in communication with the channel 92 and a second end in communication with a longitudinally extending section of the slot.

The collar 52 of each ST connector 22 and 24 is configured to be juxtaposed opposite to the socket 88 of the port to which the connector is to be connected, so that the end of the socket 88 enters into the interior of the collar 52. Each socket includes a longitudinally extending slot 96, having a flared entryway, which extends from the front or top edge of the socket to a point closely adjacent the base of the socket. Each slot 96 is configured to receive a short projection (not shown) extending outward from the ferrule to align the pins 90 with the channels 92 of the ferrule. Accordingly, when the ST connector 22 or 24 is pushed inward with respect to the socket 88 of the port to which the connector is to be connected, the short projection of the collar will enter into the flared entryway of the slot 96 of the socket to guide the ST connector with respect to the socket 88 so that the pins 90 of the socket will enter into in the channels 92 of the collar. A portion of the central hub 34 will engage a portion of the socket so that continued pushing of the ST connector into the socket will compress the spring 32, whereupon the pins 90 will enter into the angularly extending sections of the slots 94 in the collar. Twisting or rotation of the ST connector about its longitudinal axis X a quarter of a turn in the clockwise direction will cause the pins 90 the move down the angularly extending sections of the slots 94 until they reach the end thereof, whereupon the spring will provide a bias force to cause the pins to enter and slide down the longitudinally extending sections of the slots 94 to the ends thereof located adjacent the front of the collar. That action effectively locks the ST connector to the ST coupler at the port in a releasable connection with the optical fiber of the ST connector in a very good optically transmissive interface with the photo-resistor or LED at that port resulting from bias provided by the heavy-duty compression spring 32.

Disconnection of the ST connector 22 or 24 from the associated arc detection relay port is achieved by pressing the ST connector towards the port while twisting the ST connector a quarter of a turn in the counter-clockwise direction, whereupon the pins 90 will move down the longitudinally extending sections of the slots 94 to the angularly extending sections thereof, whereupon the ST connector can be rotated a quarter of a turn in the counter-clockwise direction to bring the pins to the longitudinally extending channels 92. When the pins reach the channels the ST connector can be pulled away from the socket of the arc detection relay port, thereby releasing the pins from those slots and freeing the ST connector from the port.

It should be noted at this juncture that while the ST connector 22 is described as being connected to the port 10A of the arc relay, with the ST connector 24 being connected to port 10B, the optical fiber cable assembly 20 can be connected to the relay in the opposite manner, i.e., the ST connector 22 connected to the port 10B with the ST connector 24 connected to the port 10A. In any case the releasable connection of each ST connector 22 and 24 to the associated port of the arc relay 10 will be as described above.

In order to protect the connector's prong 48 and the polished end of the optical fiber at the free end of the prong 48 until the ST connector 22 or 24 is ready to be connected to the port of the arc relay the ST connector is provided with the heretofore identified dust cap 50. That cap is a cup shaped member formed of a resilient material, e.g., rubber, and has a socket that is configured to releasably receive the prong 48 of the ST connector.

Figure 8:
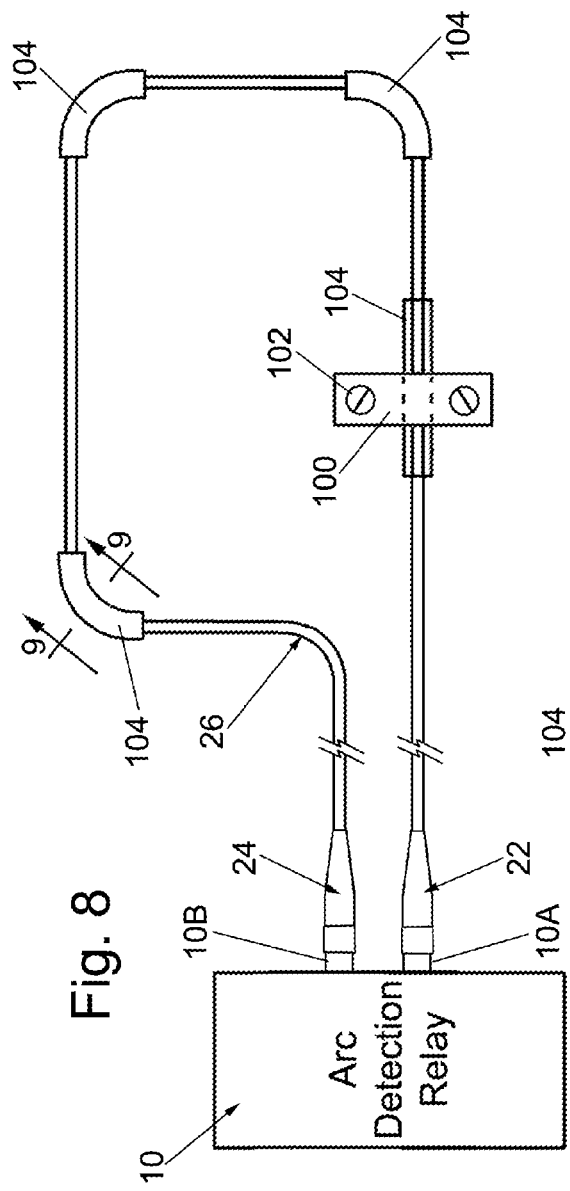
FIG. 8 is an illustration of another exemplary arc protection system of the subject invention showing the layout of an alternative ruggedized optical fiber cable assembly with sections of the optical fiber cable having extra jacketing to protect the cable at bend points or other physical stress points.

Notwithstanding the ruggedness of the optical fiber cable 26 as described above in some cases it may be desirable to further enhance the ruggedness of portions of the optical fiber cable 26 which may undergo stress for the particular application that the optical fiber cable assembly 20 is put. Some particular applications requiring enhanced ruggedness of the cable 26 are at points where the cable is subjected to a sharp bend, e.g., less than the radius specified by the fiber manufacturer, or where the cable is to be secured to some structure by a clip or some other securement device that tightly engages the cable. FIG. 8 shows one exemplary ruggedized optical cable assembly in an application having several potential points of stress along the cable where the cable is has been modified to be even more ruggedized. In particular, as shown in FIG. 8 the cable has three right angle bends and one section where the cable is mounted on a structure (not shown) by a clip or other mounting member 100 and associated screws 102.

Figure 9:
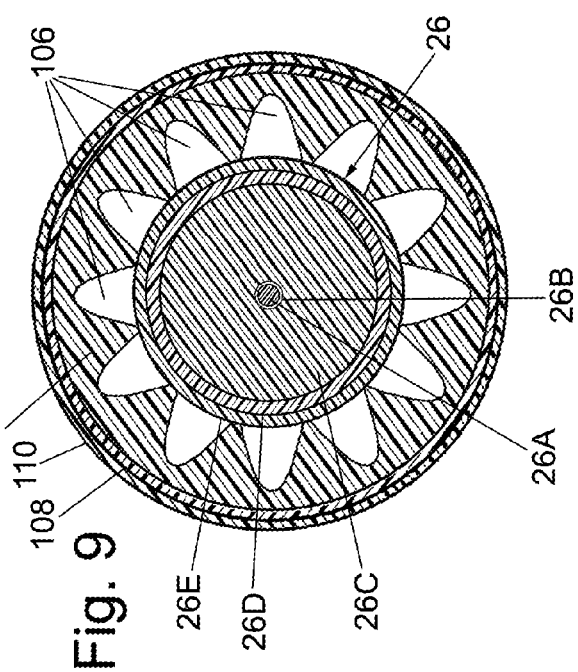
FIG. 9 is an enlarged sectional view, not exactly to scale, taken along line 9-9 of FIG. 8.

In accordance with another aspect of this invention the optical fiber cable 26 at each potential high stress region preferably includes an additional protective sleeve 104. That additional sleeve 104 is a tubular member formed of a transparent flexible material, e.g., PVC, having an outer diameter of approximately 0.25 inch. As best seen in FIG. 9 the inner surface of the sleeve 104 is in the form of a plural, e.g., twelve, equidistantly spaced grooves or channels 106 extending longitudinally along the inner surface of the sleeve. Those grooves or channels produce plural shock-absorbing air pockets protecting the cable 26 from impact or other externally applied physically-induced stress.

The sleeve 104 being a tubular member may be readily mounted on the jacket 26C of the cable 26 at any point thereon by merely slitting the sleeve between its ends to enable it to be opened and then extended around the portion of the cable 26 be more ruggedized, whereupon the opened sleeve will reassume its closed state engaging the jacket 26C of the cable 26. It is preferred that the sleeve 104 is pre-formed with a longitudinal radius 25% larger than specified by fiber manufacturers for ease of assembly and continuous unstressed long-term performance.

As can be seen in FIGS. 8 and 9 the sleeve is used at bends in the cable, e.g., the three right angle turns shown in FIG. 8. In accordance with a preferred aspect of this invention the outer surface of the sleeve 104 is constructed to prevent ambient light from entering into the cable from the side thereof and also preventing light from within the cable (such as the light representing a detected arc flash) from exiting the cable through the side of the cable at the bend. In particular, a thin, e.g., 0.005 inch, layer of a reflective material 108, e.g., metalized granular particles on a PVC tape, is provided on the outer surface of the sleeve 104 and a thin, e.g., 0.031 inch layer of an opaque material 110, e.g., PVC, is provided on the outer surface of the layer 108. Thus, with the layers 108 and 110 on the sleeve 104 there will be virtually no light loss through the cable at the bend, nor will ambient light be able to enter the cable at the bend.

As mentioned above the optical fiber cable assembly 20 of this invention can be used in what is called a loop configuration, like shown in FIG. 2. In such a configuration roughly half of the optical fiber cable is not being used to monitor for arc flashes, but rather serves as a path between the far end FE of the cable loop (e.g., the furthermost portion of the cable located in unit E of the MCC) and the LED at port 10B in order to check the integrity of the cable. Although the five vertical sections (Units A-E) of the MCC 12 may only occupy a total length of less than ten linear feet of floor space the continuous fiber monitors 78 main power stabs, 78 outgoing cable joints, all bus connections in the top busway, including the 3 field installed bolted splice bars and has no excess fiber unused (as shown in upper corners when the prior-art segmented cable was used). For maximum safety, a handheld Electronic Switching Unit operated remotely is preferred. Moore preferred all the inputs shown would be wired into a computer.

Figure 10:
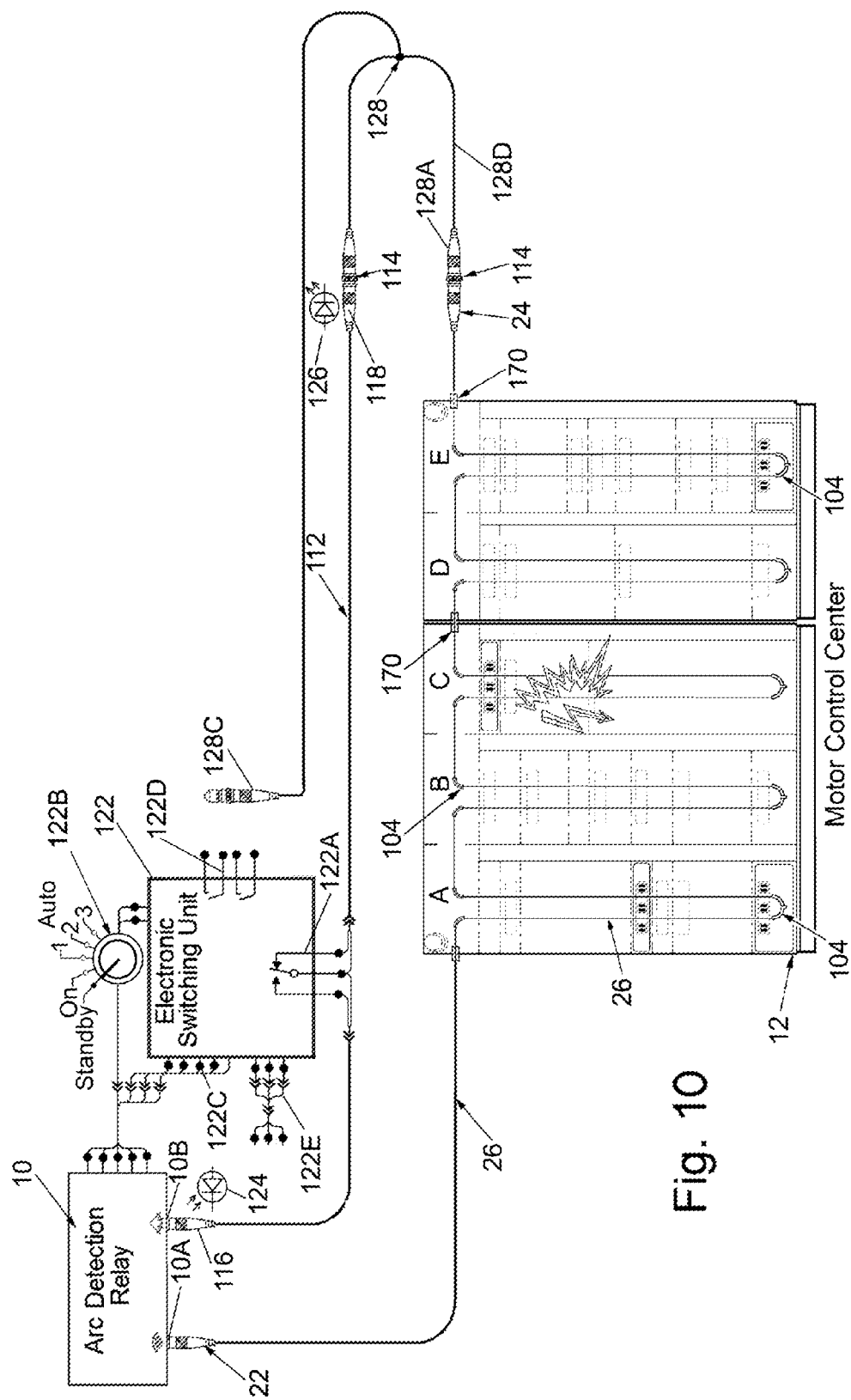
FIG. 10 is an illustration of another exemplary arc protection system of the subject invention making the use of the optical fiber cable assembly of FIG. 1 with its near end ST connector connected to an arc detection relay, and with its far end ST connector connected to an auxiliary electrical cable constructed in accordance with this invention, and with the auxiliary electrical cable being connected back to the arc detection relay to enable that relay to periodically check the integrity of the optical fiber, with the system also including an optical fiber splitter for testing the operation of the system by use of an external flash source simulating an arc flash.

Optical fiber cables, particularly one constructed like the subject invention, will inherently be somewhat more expensive than electrical conductor cables. Hence, in accordance with another aspect of this invention, an accessory or auxiliary electrical cable 112 is provided to serve as the cable portion connecting the LED port 10B of the arc detection relay 10 to the ST connector of the optical fiber cable 26 located the furthest distance from the arc detection relay to enable the integrity of the optical fiber cable to be continuously monitored by the arc detection relay. That auxiliary electronic cable 112 is shown in FIG. 10 connected to an optical fiber cable assembly 20 protecting an MCC like shown in FIG. 2. In that example, the ST connector 22 is connected to the port 10A of the arc relay 10, but with the furthest end of the optical fiber cable assembly 20, i.e., the ST connector 24, being located at or closely adjacent outside the end wall of the cabinet of Unit E of the MCC. In that exemplary application the auxiliary electronic cable 112 is connected to the ST connector 24 by means of a ST coupler 114 and a portion of an optical fiber splitter 128, whose details will be described later with reference to FIGS. 10A, 12 and 13.

The auxiliary electronic cable 112 is best shown in FIG. 11 and basically comprises a first modified ST connector 116, a second modified ST connector 118, an electrical cable 120, and an Electronic Switching Unit 122. Power is supplied to the Electronic Switching Unit 122 by any suitable conventional means (not shown) or by the arc detection relay itself. In any case, the electrical cable 120 includes a pair of electrical conductors connected between the modified ST connectors 116 and 118. The modified ST connectors 116 and 118 are similar in construction to the ST connectors 22 and 24 of optical fiber cable assembly 20 except that the modified ST connector 116 includes a light detector, e.g., a photocell or photo-resistor, 124 (shown schematically in FIGS. 10 and 11) located within the interior of the ST connector 116. The ST connector 118 includes a light producing member, e.g., a light emitting diode (LED), 126 (also shown schematically in those figures) located within the interior of the ST connector 118.

The modified ST connector 116 also includes a section of the optical fiber. The outer end of that optical fiber section terminates at the free end or face of the prong 48. The inner end of the optical fiber section exits a portion of the ferrule and into a good light transmissive engagement with the photo-resistor 124 in the modified ST connector 116. The electrical connections to the photo-resistor 124 are provided by a pair of electrical conductors forming a portion of the electrical cable 120. The modified ST connector 118 also includes a section of the optical fiber. The outer end of that optical fiber section terminates at the free end or face of the prong 48 of the connector 118. The inner end of the section exits a portion of the ferrule and into a good light transmissive engagement with the LED 126 in the modified ST connector 118. The electrical connections to the LED 126 are provided by the pair of electrical conductors of the electrical cable 120. The electrical conductors of the electrical cable 120 are very thin and are connected at one end thereof to the photo-resistor 124 in the modified ST connector 116 and at the other end thereof to the LED 126 in the modified ST connector 118. The conductors of the cable 120 are connected to a solid state relay 122A forming a portion of an Electronic Switching Unit 122. The Electronic Switching Unit also includes an associated multi-function mode selector switch 122B, a port I/O replicator 122C, command signal ports 122D, and breaker status ports 122E. The functions of those components will be described later.

Electrical power and control for energizing the LED 126 to produce the optical fiber integrity testing light bursts at the desired repetition rate, e.g., every five seconds, is provided from a low voltage circuit board also forming a portion of the Electronic Switching Unit 122. Thus, when the modified ST connector 116 is coupled to the port 10B of the arc detection relay 10 the light pulses produced by the LED at that port will be received by the photo-resistor 124 of the modified ST connector 116, which will convert those light pulses into a series of electrical signal and provide those signals to the conductors of the cable 120 down the length of the cable to the LED 126 in the modified ST connector 118. That action will cause the LED 126 to produce light pulses at the repetition rate of the light pulses produced by the LED in the port 10B of the arc detection relay 10. The modified ST connector 118 is connected to the ST connector 24 by a portion of a splitter 128 and associated ST couplers 114, whose details will be described later. Suffice it for now to state that the light pulses produced by the LED 126 will be carried without significant attenuation from the modified ST connector 118 into the ST connector 24 of the optical fiber assembly 20 from whence they will pass through the cable 26 and the ST connector 22 to the photo-resistor 14A at the port 10A of the arc detection relay 10. Thus, when the photo-resistor 14A receives those periodic pulses of light the arc detecting relay 10 will recognize that the optical fiber of the cable assembly 26 is intact.

As will be appreciated by those skilled in the art, the arrangement shown in FIG. 10 is what is called a "loop" configuration. In particular, the optical fiber cable assembly 20, the auxiliary electronic cable 112, the portion of an optical splitter 128 (to be described shortly), and the interposed couplers 114 form a loop between the ports 10A and 10B of the arc detection relay. That loop configuration enables the integrity of the optical fiber cable 26 to be continually monitored by the arc detection relay. If for some applications periodically monitoring the integrity of the optical fiber cable is not necessary or desired, the optical fiber cable assembly 20 can be configured in a "radial" configuration, whereupon the optical cable can be strung along the equipment to be monitored with the ST connector 24 located furthest away from the arc detection relay, i.e., at point FE.

As mentioned above the system shown in FIG. 10 makes use of an optical fiber splitter 128. That splitter is provided in accordance with one preferred aspect of this invention to test the operability of the system, i.e., if the system would detect an arc flash in any portion of the equipment being monitored by the optical fiber cable 26 if an arc flash occurred.

The splitter 128 is a conventional device readily available from several manufacturers and is best seen in FIG. 10A. The splitter 128 basically comprises a first ST connector 128A, a second ST connector 128B, a third ST connector 128C and an optical fiber cable connecting the connectors. Each of the connectors 128A-128C is of identical construction. Light introduced into the end of the optical fiber at any of its ST connectors 128A-128C will be distributed to the other ST connectors of the splitter 128 by the cable 128D.

Turning back to FIG. 10 it can be seen that the ST connector 128A of the splitter 128 is connected to the ST connector 24 of the cable assembly 20 by an ST coupler 114. The ST connector 128B of the splitter 128 is connected the modified ST connector 118 of the auxiliary electronics cable 112 by another ST coupler 114. The modified ST connector 118 is connected to the modified ST connector 116 via the interconnected cable 120. As described above, the modified ST connector 116 is connected to the port 10B of the arc detection relay. The conductors making up the cable 120 are also connected to the solid state relay 122A of the Electronic Switching Unit 122.

The ST connector 128C of the splitter 128 is disposed adjacent the Electronic Switching Unit 108 and serves as a manual test probe for receiving a test burst of light that is used to simulate an arc flash to determine if the system is operative to detect an arc flash if it occurs. To that end, the mode selector switch 122B, which will be described later, is rotated to its "Standby" position or mode to disable the circuit breaker which would normally be tripped upon the detection of an arc flash, so that it will not trip during the test. With the mode selector switch 122B in the Standby position a worker with an external source of high intensity light (e.g., camera flash unit) can shine the light from the flash into the end of the optical fiber of the test probe 128C. That test light will pass through the connector 128C into the cable 128D and from there to the ST connector 128A to exit the ST connector 128A from whence it will enter into the optical fiber of the ST connector 24 of the optical fiber cable assembly 20. That light will then be carried by the optical fiber of the cable to the ST connector and through it into the port 10A of the arc detection relay. Upon receipt of that light the photo-resistor 124 at the port 10A will convert the light into an electrical signal which results in a small LED on the arc detection relay illuminating to thereby provide a visual signal that the system is operative for detecting an arc flash. The associated circuit breaker will not trip as a result of the receipt of light at the port 10A since the switch 122B is in the Standby mode.

Accordingly, by use of the probe 128A as just described the operability of the system to detect an arc flash in any of the MCC units A-D will be determined since the test port 128C is located upstream of all of the electrical components to be monitored. After the system has been determined to be operative, the mode switch 122B can be rotated to the "ON" position to place the arc protection system into standard operation.

While the system shown in FIG. 10 locates the test probe 128C upstream of the equipment being protected, e.g., adjacent the Electronic Switching Unit, it need not be located thereat. In this regard, the test probe 128C can be located at any place upstream of electrical equipment where an arc fault may occur to enable a worker to test the operability of the system to detect an arc fault downstream of the position of the test probe. Thus, for example, if one wanted to test the operability of the system to detect an arc flash in any of the Units A, B or C making up the that shipping unit, the test probe 128C would be located between Unit C of that shipping unit and Unit D of the adjacent shipping unit. With the test probe at that location one could not confirm the operability of the system to detect an arc flash at either Unit D or Unit E, but could determine the operability to detect an arc flash in any of the Units A, B or C.

The positioning of the test probe 128C upstream of the MCC (or any other electrical equipment being protected) in order to check system operability, as described above, offers advantages over prior art techniques. In this regard, the prior art requires a worker testing the operability of the system produce a simulated arc flash at each location where an arc flash may occur, e.g., at various points in the MCC Units A-E. Needless to say requiring a worker to individually test each unit of the MCC (or other equipment where an arc flash may be produced) is expensive and time consuming. Moreover, it exposes the worker to potential injury from high voltage at the location of each section to be tested. In contrast, by locating the test probe of the subject invention upstream of the MCC a worker can safely determine that the system is operative to detect an arc flash in any of the MCC's units, without requiring testing of each of those units.

Turning now to FIGS. 12-14 the details of the ST coupler 114 will now be described.

That coupler is similar in most respects to a conventional coupler for connecting ST connectors between adjacent shipping units of an MCC or other electrical equipment. Such connecting couplers are sometimes referred to shipping couplers. One particularly suitable ST coupler is available from Amphenol Fiber Systems International as part number MSTA1300 or from Optical Cable Corporation as part number 83522/17-NY. The ST coupler 114 basically comprises a tubular member having a body 130 including a central passageway 132 extending longitudinally therethrough. Each end of the body is in the form of an ST type socket 88 like that described with reference to the ST couplings at the ports 10A and 10B of the arc detection relay 10. Thus, each socket includes the heretofore identified diametrically opposed pair of small pins 90, and the longitudinally extending slot 96 with the flared entryway disposed between the pins.

In accordance with one aspect of this invention a tubular insert 134, preferably formed of Zirconium, is located in the center of the central passageway 132. The inner diameter of the tubular insert is dimensioned to accept the prongs 48 of two ST connectors end-to-end so that the optical fibers of those prongs are precisely axially aligned and can be brought into engagement with each other in a good light-transmissive interface.

The outer surface of the central portion of the body 130 of the connecting ST coupler 114 includes plural helical threads 136 extending thereabout. The threads are interrupted by a pair of diametrically opposed flattened surfaces 138. An annular wall 140 projects outward from the central portion of the body immediately adjacent the helical threaded portion. The outer surface of the annular wall 140 includes a plurality of longitudinally extending ridges and interposed grooves to provide a surface that can be readily gripped. A hex nut 142 and a lock washer 144 are located on the threaded portion 136. The nut and washer serve as means for mounting the ST coupler 114 onto a wall or other barrier, with one socket 88 of the coupler extending from one side of the wall or barrier and the opposite socket 88 of the coupler extending from the opposite side of the wall or barrier. Thus the prongs 48 of two ST connectors can be brought into a good light transmissive abutting relationship in the coupler 114 to connect those two ST connectors through the wall or barrier. As is conventional a pair of removable dust covers or caps 216 is provided to protect the ST sockets 88 of the connecting ST coupler 114.

Use of the connecting ST coupler 114 to connect the modified ST connector 118 of the auxiliary electronic cable 112 to the ST connector 24 of the optical fiber cable assembly 20 in the system illustrated in FIG. 10 is a follows. The caps 146 of the ST coupler 114 are removed from its two opposed ST sockets 88 to expose the respective ends of the connector's passageway 130. The ST connector 24 of the optical fiber cable assembly 20 is juxtaposed with respect to the left side socket 88 of the ST coupler 114 so that when the short projection of the ferrule of the ST connector 24 aligns with the slot 96 of the coupler 114 the prong 48 of the ST connector 24 can be inserted into the end of the passageway 130 in that socket. The ST connector 24 can then be pushed inward with respect to the socket so that the projection enters into the flared entryway of the slot 96 to guide the ST connector 24 with respect to the socket so that the pins 90 eventually enter into the longitudinally extending channels 92 of the ferrule and from there into the angularly extending sections of the slots 94 as described above with respect to the connection of the ST connectors 22 and 24 to the ports 10A and 10B of the arc detection relay. The ST connector 24 can be twisted about its longitudinal axis X a quarter of a turn in the clockwise direction to cause the pins 90 to move down the angularly extending sections of the slots 94 and into the longitudinally extending sections of those slots where the bias provided by the compression spring 32 will carry the pins to the end of the longitudinally extending sections of the slots as also described above. That action releasably locks the ST connector 24 to the socket of the ST coupler 114, with the end of the optical fiber of the ST connector 24 located at the middle of the passageway in the tubular insert 134. The right side socket 88 of the coupler 114 is connected to the ST connector of the splitter 128A in a similar manner so that the end of the optical fiber of the ST connector 128A forms a good light transmissive abutting interface with the end of the optical fiber of the ST connector 24 in the middle of the passageway in the tubular insert 134.

It should be noted that dimensions of the ST coupler 114 renders it limited to mounting in walls or barriers having a thickness at or below 0.78 inch, i.e., the US Standard Sheet Metal of 13 Gauge thickness. Thus, for applications where the ST coupler 114 is to be mounted through wall or barriers greater than that thickness, an adapter assembly 148 constructed in accordance with another aspect of this invention is provided. That adapter assembly is shown in FIGS. 14 and 15 and forms a bracket for mounting the ST coupler on a wall or other barrier, irrespective of the thickness of the wall or barrier. The adapter assembly 148 basically comprises a circular disk-like member, whose thickness is less than the US Standard Sheet Metal of 13 Gauge thickness. The disk-like member is made up of two half circular sections 150 and 152 which are pivotably connected to each other at a pivotable joint 154. The half sections include respective recesses at their interface which when the half sections are in the closed position like shown in FIG. 14 form an opening configured to accommodate the portion of the ST coupler where the threads 136 and flats 138 are located. The section 152 includes a rolled pin 158 projecting from one face of that section. A screw 160 is provided to extend through a hole in the other section 150 with the threaded shaft of the screw pointing in the same direction as the rolled pin 158.

The adapter assembly 148 is configured to mount the ST coupler 114 onto a wall or panel that is thicker than the US Standard Sheet Metal of 13 Gauge thickness as shown in FIG. 15. In FIG. 15 the adapter assembly 148 is shown mounting the ST coupler 114 through an opening 162 in a thick wall panel 164, e.g., a conventional sheet rock panel. To that end, the ST coupler is inserted through the opening 162 in the wall panel 164 so that one socket 88 of the coupler is on one side of the wall panel and the other socket of the coupler is on the opposite side of the wall panel. A small bore 166 is provided in the wall 164 adjacent the opening 162. The free end of the roll pin 158 is inserted into the bore 166 to connect the circular section 152 to the wall panel 164. The half circular section 150 is pivoted about the pivot joint 154 to an open position so that the two half sections are separated but with portions thereof contiguous with side of the annular wall closest to the threaded side of the coupler. The two half circular sections 150 and 152 can then be pivoted together to closed position, like shown in FIG. 14, to form the heretofore mentioned opening accommodating the portion of the ST coupler where the threads 136 and flats 138 are located. The screw 160 can then be inserted through the hole in the half circular section 150 and into the underlying portion of the panel 164 to fixedly secure the adapter assembly 148 to the wall panel. The nut 142 and the lock washer 144 can then be placed on the threaded portion 136 of the body and tightened to sandwich the now closed half sections 150 and 152 between the annular wall and the lock washer and thus complete the mounting of the coupler to the wall. It should be noted that the nut and lock washer can be placed on the body of the coupler before the two half section 150 and 152 are pivoted to the closed position. In that case there should be some space left between the lock washer and the annular wall into which the portions of the half sections contiguous with the recesses 156 can fit so that the two section can be pivoted to the closed state. Once that has been accomplished the nut and lock washer can be tightened to sandwich the now closed half sections between the annular wall and the lock washer. In any case, once the ST connector is mounted on the wall or barrier the coupler 114 is ready to accept the prongs 48 of two ST in an abutting optically transmissive joint or interface within the central passageway of the insert 134, For applications where the optical fiber cable 26 can pass through a wall or partition without necessitating use of two ST connectors, a transit coupler 170 like shown in FIGS. 16 and 17 can be used. That type of coupler and its use offers the advantage of no loss of the optical signal since the optical fiber is continuous where it passes through the transit coupler and does not make use of an abutting joint like in the connection ST connector 114.

In the exemplary embodiment of the system shown in FIG. 10 a transit coupler 170 is located in an outer end wall of the cabinet making up MCC Unit A. Another transit coupler 170 is located in the end wall of the cabinet making up the MCC Unit C and the immediately adjacent end wall of the cabinet making up the MCC Unit D. Another transit coupler 170 is located in an outer end wall of the cabinet making up the MCC Unit E. Thus the entire run of optical cable through the MCC will be continuous without any joints. Preferably a section of the air pocketed sleeve 104 with its layers 108 and 110 will be provided about the portion of the continuous optical cable 26 which passes through the each of the transit couplers 170. The use of such sleeve sections provides shock absorption, while precluding ambient light from entering into the optical fiber of the cable.

The transit coupler 170 is best seen in FIG. 16-18 and basically comprises two semi-circular half sections 172A and 172B which snap together to abut each other at interface 172C to thereby form a tubular body having a central passageway 174 (FIG. 18) extending through the body from one end to the other. The inner diameter of the passageway 174 is constant and equal to the outer diameter of the layer 110 of the air pocketed sleeve so that the cable 26 with that sleeve can be extended through the passageway, like shown in FIG. 17. The outer surface of the body of the coupler 170 at approximately the middle thereof includes plural helical threads 176 extending thereabout. The threads are interrupted by a pair of diametrically opposed flattened surfaces 178. An annular wall 180 projects outward from the central portion of the body immediately adjacent the helical threaded portion. The outer surface of the annular wall 180 includes a plurality of longitudinally extending ridges and interposed grooves to provide a surface that can be readily gripped. Two slip-on twist close nuts 182 and 184 are located on the threaded portion 176. The slip-on twist close nuts serve as means for securing the two half sections 172A and 172C together and also for securing the transit coupler 170 onto the wall 164 or other barrier through which the transit coupler is to be extended. If the wall or barrier through which the transit coupler is to be extended is sufficiently thin, e.g., less than or equal to US Standard Sheet Metal of 13 Gauge, the transit coupler 170 can be mounted directly thereon with the thin wall or barrier interposed and held tightly between the slip-on twist close nut 182 and the enlarged wall portion 180. If the wall or barrier is thicker than US Standard Sheet Metal of 13 Gauge, the heretofore discussed adapter assembly 148 is used like shown in FIG. 18. The manner of mounting the transit coupler 170 and the adapter assembly 148 onto the thick wall or barrier 164 is the same as described with reference to FIG. 15 and will not be reiterated in the interest of brevity. In accordance with one exemplary preferred embodiment of the transit coupler 170 it is formed of marine grade naval brass, with a corrosion resistant silver plating finish.

As will be appreciated by those skilled in the art the combination of the two slip-on twist close nuts 82 and 84 cooperate with each other to as a jam nut holding the transit coupler 170 in place without the need of a lock washer and also facilitates quick assembly of the transit connector since the slip-on twist close nuts can be placed laterally onto the threaded portion 176 of the half sections at any point therealong without having to screw the nuts to that point. If desired to facilitate the mounting of the connecting ST coupler 114 on a wall or barrier that coupler can be constructed to make use of two slip-on twist close nuts 82 and 84 instead of using the hex nut 142 and the lock washer 144.

Turning back to FIG. 10 the details of the Electronic Switching Unit 122 will now be described. The solid state relay 122A is configured to electrical provide pulses to the conductors 120 of the auxiliary electronic cable in synchronism with the light pulses produced by the LED 14B at the arc relay port 10B. The mode selector switch 122B is a multi-position switch, which can be rotated to any one of plural positions shown in FIG. 10. The two standard positions are the "On" and "Standby" positions. The "On" position is the setting of the arc protection system when the system is in operation to monitor for arc flashes occurring at any portion of the electrical equipment along which the optical cable 26 is strung. When the switch 122B is moved to the "Standby" position the (e.g., the circuit breaker) protecting that electrical equipment will be disabled, i.e., cannot trip. Thus, the mode selector switch will be moved to the "Standby" position during the testing of the system using the manual probe 128C as discussed above. The I/O port replicator 122C is coupled to and replicates various ports of the arc detection relay 10 to extend the function of the arc detection relay. Automatic functions available to the resident end-user engineer may include: the operation of the Electronic Switching Unit and arc detection relay as either a master or a slave, operation of the mode selector switch to override the arc detection relay i.e., light only, although the relay is set for current validation. More specific automatic position functions can include accelerated tripping, as when maintenance personnel perform "racking" operations. Here series tripping is used to clear faults faster than with only one breaker. Another function would be to trip an alternate feed source, i.e., emergency power. Advanced functions may include use of a grounding switch in lieu of quenching fault current using air resistance. The command signal ports 122D constitute the ports to provide the command signals to the associated circuit breaker(s) to trip up the detection of an arc flash by the arc detection relay. The breaker status ports 122E are configured to receive signals from the associated breaker(s) as to their current operating status, e.g., whether they are on or off.

As should be appreciated by those skilled in the art from the foregoing, the subject invention addresses many of the needs of the prior art for a ruggedized optical fiber cable having ruggedized ST type connectors that can be used with AFD photo-sensors, such as the ABB Arc Protection Relay REA101 by providing an accessory or auxiliary, electronics cable to enable the photo-sensor circuit to periodically monitor fiber integrity without connection to the photo-sensor's LED port. That feature enables utilizing the entire fiber length for monitoring in auto-check mode for radial, as well as conventional loop-type configurations. Moreover, the subject invention reduces joint attenuation (db) losses by precisely aligning the bare optical fiber ends being connected. Furthermore, the ruggedized ST connectors of this invention can be used with conventional opaquely jacketed fibers in other types of applications. Further still, the subject invention provides transit mounting for MIL-C-83522[2] standard ST-to-ST adapters.

In conclusion it must be pointed out that the embodiments disclosed and described above are merely example of various embodiments that can be constructed in accordance with the teaching of this invention and used in various applications to protect electrical equipment at which an arc fault could occur. Thus, while the embodiments disclosed above are shown protecting downstream equipment, e.g., MCCs, switch gear, transformers, etc., the systems of this invention can be used to protect any upstream source. Moreover, although corona can be present before an arc flash and is also present in higher voltage systems where no arc is imminent the Littelfuse PGA-LS30 and the Stromberg relays electronic designs both filter out all corona data. In accordance with one aspect of this invention one could insert a separate optical fiber for corona wavelength detection in sleeve 104. That can be accomplished by simply inserting a separate physical fiber segment tap along one of the longitudinal air pockets of the sleeve 104 for a very short distance. The tap can be connected to a user's data logger device using a suitable connector type to data available for third party software analysis as a proactive, rather than only a reactive feature. Additionally, data log recordings could serve a valuable resource in understanding an arc flash incident. Furthermore, the materials identified for the various component and the dimensions of the various components can be selected as desired within the scope of this invention. Further still, a signal splitter of the same material as the core fiber could also be used with ST connectors attached that could also be used to trip two separate zones if the trip command signal was routed through the breaker auxiliary contacts to show that the particular main breaker was conducting power to the branch circuit. This would eliminate need for a second arc detection relay.

Without further elaboration the foregoing will so fully illustrate my invention that others may, by applying current or future knowledge, adopt the same for use under various conditions of service.

I claim:

1. A ruggedized optical fiber cable assembly for use with an arc detection relay to protect an electrical component from a fault resulting in an arc flash, the arc detection relay having a first port including a light detector and a second port including a light producing member, said optical fiber cable assembly comprising:
   an optical fiber cable comprising a thin optical fiber surrounded by a transparent jacket consisting of an outer sleeve formed of a transparent flexible material and a transparent cured gel interposed between said outer sleeve and said optical fiber, said optical fiber having a first end and a second end and being configured to enable light produced by an arc flash in the vicinity of said optical fiber cable to enter into said optical fiber cable through said transparent jacket to be carried down said thin optical fiber;
   a first connector connected to said first end of said optical fiber cable, said first connector including a first ferrule and a first boot, said first ferrule including a first prong having a first passageway through which said thin optical fiber extends to an end of said first prong, said first boot being formed of a resilient material and having front end, a rear end, and a passageway extending through said first boot between said front end and said rear end of said first boot, said front end of said first boot being connected to said first ferrule, said first passageway at said rear end of said first boot engaging said jacket of said optical fiber cable to provide vibration resistance for said thin optical fiber; and
   a second connector connected to said second end of said optical fiber cable, said second connector including a second ferrule and a second boot, said second ferrule including a second prong having a passageway through which said thin optical fiber extends to an end of said second prong, said second boot being formed of a resilient material and having front end, a rear end, and a second passageway extending through said second boot between said front end and said rear end of said second boot, said front end of said second boot being connected to said second ferrule, said second passageway at said rear end of said second boot engaging said jacket of said optical fiber cable to provide vibration resistance for said thin optical fiber.

2. The ruggedized optical fiber cable assembly of claim 1, wherein said first ferrule is formed of stainless steel, wherein said end of said first prong is formed of marine grade, high-strength and corrosion-resistant metal, said second ferrule is formed of stainless steel, wherein said end of said second prong is formed of marine grade, high-strength and corrosion-resistant metal.

3. The ruggedized optical fiber cable assembly of claim 1, wherein said jacket is formed of clear UV stabilized polyvinylchloride.

4. The ruggedized optical fiber cable assembly of claim 1, wherein said cured gel comprises clear low-viscosity cured UV silicone.

5. The ruggedized optical fiber cable assembly of claim 1, wherein said optical fiber has an outer diameter of approximately 0.038 inch.

6. The ruggedized optical fiber cable assembly of claim 1, wherein said gel has a diameter of approximately 0.047 inch.

7. The ruggedized optical fiber cable assembly of claim 1, wherein said jacket has a diameter of approximately 0.127 inch.

8. The ruggedized optical fiber cable assembly of claim 1, wherein said first connector is configured to be connected to the first port of the arc relay, wherein said first connector additionally comprises a first spring coupled to said first ferrule and configured for causing said end of said first prong to engage said first port to produce a good light path between said thin optical fiber and the light detector at the first port when said first connector is connected to the first port, wherein said second connector is configured to be connected to the second port of the arc relay, and wherein said second connector additionally comprises a second spring coupled to said second ferrule and configured for causing said end of said second prong to engage said second port to produce a good light path between said thin optical fiber and the light producing member at the second port when said second connector is connected to the second port.

9. The ruggedized optical fiber cable assembly of claim 8, wherein the first and second ports of the relay each include a detent component, wherein said first ferrule includes a slot configured to receive the detent component of the first port to place said first spring to cause said end of first polished prong to engage said first port to produce the good light path between said thin optical fiber and the light detector at the first port, wherein said second ferrule includes a slot configured to receive the detent component of the second port to place said second spring under compression to cause said end of said second prong to engage said second port to produce the good light path between said thin optical fiber and the light producing member at the second port.

10. The ruggedized optical fiber cable assembly of claim 1, additionally comprising a first opaque sleeve and a second opaque sleeve, said first opaque sleeve being disposed about said optical fiber cable between said optical fiber cable and said first passageway at said rear end of said first boot, said second opaque sleeve being disposed about said optical fiber cable between said optical fiber cable and said second passageway at said rear end of said second boot.

11. The ruggedized optical fiber cable assembly of claim 1, wherein said optical fiber cable additionally comprises at least one sleeve having a plurality of grooves in an inner surface thereof, said at least one sleeve being located surrounding and secured to said jacket to produce a plurality of shock absorbing air pockets between said sleeve and said jacket to enhance the ruggedness of said optical fiber cable assembly at the location of said at least one sleeve.

12. The ruggedized optical fiber cable assembly of claim 11, wherein said at least one sleeve is transparent.

13. The ruggedized optical fiber cable assembly of claim 11, wherein said at least one sleeve has an outer diameter of approximately 0.025 inch.

14. The ruggedized optical fiber cable assembly of claim 13, wherein said at least one sleeve has a pair of ends and wherein said at least one sleeve is split between said pair of ends to enable said at least one sleeve to be flexed open to place it on said jacket of said optical fiber cable.

* * * * *